US012238731B2

(12) United States Patent
Wang et al.

(10) Patent No.: US 12,238,731 B2
(45) Date of Patent: Feb. 25, 2025

(54) OVERLAPPING SIDELINK GRANT AND BEAM MANAGEMENT

(71) Applicant: QUALCOMM Incorporated, San Diego, CA (US)

(72) Inventors: Xiaojie Wang, Hillsborough, NJ (US); Sony Akkarakaran, Poway, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/584,166

(22) Filed: Jan. 25, 2022

(65) Prior Publication Data

US 2023/0239880 A1    Jul. 27, 2023

(51) Int. Cl.
*H04W 4/00* (2018.01)
*H04W 72/23* (2023.01)
*H04W 72/40* (2023.01)
*H04W 72/566* (2023.01)

(52) U.S. Cl.
CPC .......... *H04W 72/23* (2023.01); *H04W 72/40* (2023.01); *H04W 72/569* (2023.01)

(58) Field of Classification Search
CPC ... H04W 72/23; H04W 72/40; H04W 72/569; H04W 72/046
See application file for complete search history.

(56) References Cited

U.S. PATENT DOCUMENTS

| 2020/0413295 | A1* | 12/2020 | Li ........................ H04W 72/53 |
| 2021/0282143 | A1* | 9/2021 | Lee ...................... H04W 52/343 |
| 2022/0039064 | A1* | 2/2022 | Raghavan ............ H04B 7/0617 |
| 2022/0330209 | A1* | 10/2022 | Ding ...................... H04W 28/12 |
| 2024/0137754 | A1* | 4/2024 | Balasubramanian ... H04W 8/22 |
| 2024/0146472 | A1* | 5/2024 | Herath .................. H04B 1/7143 |

FOREIGN PATENT DOCUMENTS

WO    WO-2021023382 A1 *   2/2021   ........... H04B 7/0617

* cited by examiner

*Primary Examiner* — Edan Orgad
*Assistant Examiner* — Hidayat Dabiri
(74) *Attorney, Agent, or Firm* — Holland & Hart LLP/Qualcomm Incorporated

(57) ABSTRACT

Methods, systems, and devices for wireless communications are described. A user equipment (UE) may have a capability to support a number of temporally overlapping sidelink transmissions. The network may transmit first and second signaling that schedule temporally overlapping first and second sidelink transmissions based on first and second configured grants. The UE may transmit at least one of the first or second sidelink transmissions based on whether the first sidelink transmission and the second sidelink transmission are associated with a same beam or different beams and a frequency relationship between the first and second sidelink transmissions. If the UE is not capable of transmitting the first and second sidelink transmissions concurrently, the UE may transmit the sidelink transmission associated with the higher priority. The first and second sidelink transmissions may be scheduled with overlapping frequency resources. The UE may resolve the frequency overlap by reallocating the overlapping frequency resources.

26 Claims, 13 Drawing Sheets

First Signaling 205

Second Signaling 210

First Transmission 215

Second Transmission 220

OVERLAPPING SIDELINK GRANT AND BEAM MANAGEMENT

FIELD OF TECHNOLOGY

The following relates to wireless communications, including overlapping sidelink grant and beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support overlapping sidelink grant and beam management. Generally, the described techniques provide for resolving overlapping sidelink transmissions scheduled according to grants. A user equipment (UE) may have a capability to support a number of temporally overlapping sidelink transmissions. The capability may include a capability to support temporally overlapping sidelink transmissions using a number of beams, a capability to support temporally overlapping sidelink transmissions using a number of sidelink transmissions per beam, or both. The network (e.g., a base station) may transmit first and second signaling that schedules temporally overlapping first and second sidelink transmissions based on first and second configured grants. The UE may transmit at least one of the first sidelink transmission or the second sidelink transmission based on the UE's capability to support a number of temporally overlapping sidelink transmissions, whether the first sidelink transmission and the second sidelink transmission are associated with a same beam or different beams, and a frequency relationship between the first sidelink transmission and the second sidelink transmission.

In some examples, the respective configured grants may indicate a priority associated with each of the first sidelink transmission and the second sidelink transmission. If the UE is not capable of transmitting the first sidelink transmission and the second sidelink transmission concurrently, the UE may transmit the sidelink transmission associated with the higher priority. In some examples, the configured grants may schedule the first and second sidelink transmissions with overlapping frequency resources. In some examples, the UE may resolve the frequency overlap by reallocating the overlapping frequency resources between the overlapping sidelink transmissions. The UE may reallocate the overlapping frequency resources based on a priority associated with the first and second sidelink transmissions or based on the resource allocation associated with the first and second sidelink transmissions.

A method for wireless communications at a user equipment (UE) is described. The method may include receiving, from a base station, first signaling that schedules a first sidelink transmission based on a first grant, receiving, from the base station, second signaling that schedules a second sidelink transmission based on a second grant, where the second sidelink transmission at least partially overlaps in time with the first sidelink transmission, and transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

An apparatus for wireless communications at is described. The apparatus may include memory, a transceiver, and at least one processor of a user equipment, the at least one processor coupled with the memory and the transceiver. The at least one processor may be configured to cause the apparatus to receive, from a base station, first signaling that schedules a first sidelink transmission based on a first grant, receive, from the base station, second signaling that schedules a second sidelink transmission based on a second grant, where the second sidelink transmission at least partially overlaps in time with the first sidelink transmission, and transmit at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

Another apparatus for wireless communications at a UE is described. The apparatus may include means for receiving, from a base station, first signaling that schedules a first sidelink transmission based on a first grant, means for receiving, from the base station, second signaling that schedules a second sidelink transmission based on a second grant, where the second sidelink transmission at least partially overlaps in time with the first sidelink transmission, and means for transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

A non-transitory computer-readable medium storing code for wireless communications at a UE is described. The code may include instructions executable by a processor to receive, from a base station, first signaling that schedules a first sidelink transmission based on a first grant, receive, from the base station, second signaling that schedules a second sidelink transmission based on a second grant, where the second sidelink transmission at least partially overlaps in time with the first sidelink transmission, and transmit at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

Some examples of the method, apparatuses, and non-transitory computer-readable medium described herein may further include operations, features, means, or instructions for receiving, from the base station, an indication that the first sidelink transmission may be associated with a first beam and a first set of frequency resources and receiving, from the base station, an indication that the second sidelink transmission may be associated with the first beam and a second set of frequency resources, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first beam and a first set of frequency resources and receiving, from the base station, an indication that the second sidelink transmission may be associated with the first beam and a second set of frequency resources, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first priority level and receiving, from the base station, an indication that the second sidelink transmission may be associated with a second priority level lower than the first priority level, where transmitting the first sidelink transmission and refraining from transmitting the second sidelink transmission may be based on the second priority level being lower than the first priority level.

Some examples of the method, apparatuses, and non-transitory computer-readable medium described herein may further include operations, features, means, or instructions for receiving, from the base station, an indication that the first sidelink transmission may be associated with a first beam and receiving, from the base station, an indication that the second sidelink transmission may be associated with a second beam, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first beam and receiving, from the base station, an indication that the second sidelink transmission may be associated with a second beam, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first priority level and receiving, from the base station, an indication that the second sidelink transmission may be associated with a second priority level lower than the first priority level, where transmitting the first sidelink transmission and refraining from transmitting the second sidelink transmission may be based on the second priority level being lower than the first priority level.

Some examples of the method, apparatuses, and non-transitory computer-readable medium described herein may further include operations, features, means, or instructions for receiving, from the base station, an indication that the first sidelink transmission may be associated with a first set of frequency resources including a first subset of frequency resources and a second subset of resources and receiving, from the base station, an indication that the second sidelink transmission may be associated with a second set of frequency resources including the second subset of frequency resources and a third subset of frequency resources, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first priority level and receiving, from the base station, an indication that the second sidelink transmission may be associated with a second priority level lower than the first priority level, where transmitting the first sidelink transmission using the first set of frequency resources and transmitting the second sidelink transmission using the third subset of frequency resources may be based on the second priority level being lower than the first priority level.

Some examples of the method, apparatuses, and non-transitory computer-readable medium described herein may further include operations, features, means, or instructions for receiving, from the base station, an indication that the first sidelink transmission may be associated with a first beam and receiving, from the base station, an indication that the second sidelink transmission may be associated with a second beam, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first beam and receiving, from the base station, an indication that the second sidelink transmission may be associated with the first beam, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first set of frequency resources including a first subset of frequency resources and a second subset of resources and receiving, from the base station, an indication that the second sidelink transmission may be associated with a second set of frequency resources including the second subset of frequency resources and a third subset of frequency resources, where transmitting at least one of the first sidelink transmission and the second sidelink transmission includes.

Some examples of the method, apparatuses, and non-transitory computer-readable medium described herein may further include operations, features, means, or instructions for receiving, from the base station, an indication that the first sidelink transmission may be associated with a first priority level and receiving, from the base station, an indication that the second sidelink transmission may be associated with a second priority level, where the first portion and the second portion may have respective sizes based on a relationship between the first priority level and the second priority level.

In some examples of the method, apparatuses, and non-transitory computer-readable medium described herein, the first portion and the second portion may have respective sizes based on a first block error rate target for the first sidelink transmission, a second block error rate target for the second sidelink transmission, a channel state information condition, a transmission power capability of the UE, or a combination thereof.

In some examples of the method, apparatuses, and non-transitory computer-readable medium described herein, the first portion and the second portion may have respective sizes based on a size relationship between the first set of frequency resources and the second set of frequency resources.

Some examples of the method, apparatuses, and non-transitory computer-readable medium described herein may further include operations, features, means, or instructions for transmitting, to the base station, a report indicating a capability of the UE to transmit a quantity of one or more of temporally overlapping sidelink channel transmissions, where transmitting at least one of the first sidelink transmission and the second sidelink transmission may be based on the indicated capability of the UE.

In some examples of the method, apparatuses, and non-transitory computer-readable medium described herein, the capability includes a first capability of the UE to transmit a first quantity of one or more beams concurrently, a second capability of the UE to transmit a second quantity of one or more concurrent sidelink transmissions per beam, a third capability of the UE to transmit a third quantity of concurrent sidelink transmissions regardless of beam allocation, or any combination thereof.

DETAILED DESCRIPTION

Figure 1:
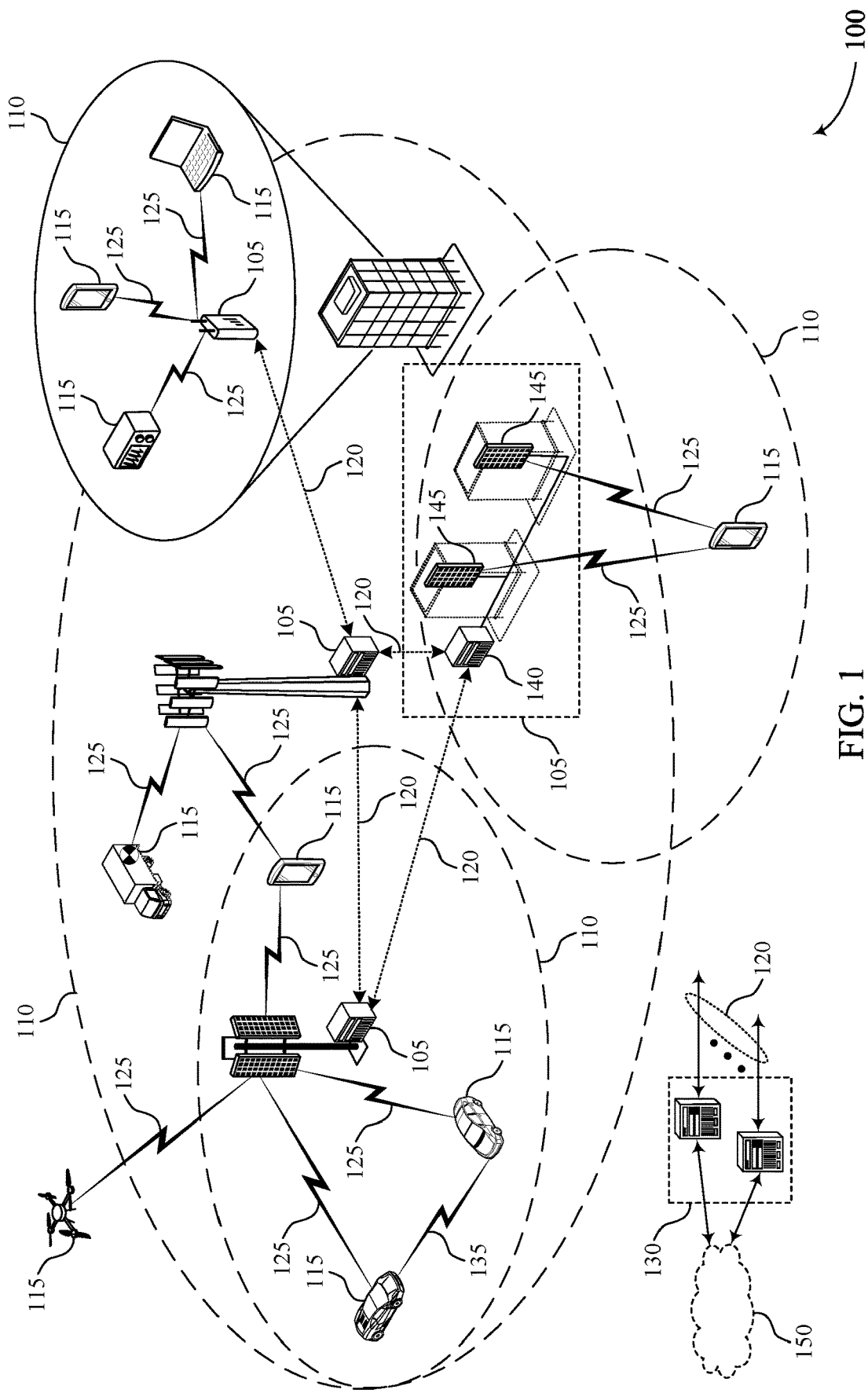
FIG. 1 illustrates an example of a wireless communications system that supports overlapping sidelink grant and beam management in accordance with aspects of the present disclosure.

Some wireless communications systems may support sidelink communications between user equipments (UEs). In some examples, the network may schedule UEs to transmit messages within sets of configured sidelink occasions (e.g., sets of sidelink occasions each based on a corresponding configured grant (CG)). For example, a configured grant may schedule the UE to transmit physical sidelink shared channel (PSSCH) messages (e.g., configured grant PSSCH (CG-PSSCH) messages). Some UEs may be capable of transmitting more than one sidelink transmission using more than one beam. For example, some UEs may include more than one antenna panel to support concurrent transmissions using more than one beam. Some UEs may be capable of transmitting more than one concurrent sidelink transmission using a same beam. Some UEs may not be capable of transmitting more than one beam. Some UEs may not be capable of supporting concurrent sidelink transmissions on the same beam. A UE may receive two grants (e.g., configured grants) scheduling two or more temporally overlapping sidelink transmissions, which may result in collisions between the overlapping sidelink transmissions.

In some examples, a UE may report the UE's capability to a base station to support a number of temporally overlapping sidelink transmissions. The capability may include a capability to support temporally overlapping sidelink transmissions using a number of beams, a capability to support temporally overlapping sidelink transmissions using a number of sidelink transmissions per beam, or both. The network (e.g., a base station) may transmit first and second signaling that schedules temporally overlapping first and second sidelink transmissions based on first and second configured grants. The UE may transmit at least one of the first sidelink transmission or the second sidelink transmission based on the UE's capability to support a number of temporally overlapping sidelink transmissions, whether the first sidelink transmission and the second sidelink transmission are associated with a same beam or different beams, and a frequency relationship between the first sidelink transmission and the second sidelink transmission.

In some examples, the respective configured grants may indicate a priority associated with each of the first sidelink transmission and the second sidelink transmission. If the UE is not capable of transmitting the first sidelink transmission and the second sidelink transmission concurrently, the UE may transmit the sidelink transmission associated with the higher priority. In some examples, the configured grants may schedule the first and second sidelink transmissions with overlapping frequency resources. In some examples, the UE may resolve the frequency overlap by reallocating the overlapping frequency resources between the overlapping sidelink transmissions. The UE may reallocate the overlapping frequency resources based on a priority associated with the first and second sidelink transmissions or based on the resource allocation associated with the first and second sidelink transmissions.

Aspects of the disclosure are initially described in the context of wireless communications systems. Aspects of the disclosure are further illustrated by and described with reference to resource configurations and process flows. Aspects of the disclosure are further illustrated by and described with reference to apparatus diagrams, system diagrams, and flowcharts that relate to overlapping sidelink grant and beam management. While some aspects of the disclosure may be described with reference to conflicts between sidelink messages scheduled by configured grants, such aspects may similarly be applied in the context of conflicts involving one or more sidelink messages scheduled by dynamic grants (e.g., one or more sidelink messages scheduled by downlink control information (DCI) messages).

FIG. 1 illustrates an example of a wireless communications system 100 that supports overlapping sidelink grant and beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may have a capability to support a number of temporally overlapping sidelink transmissions. The capability may include a capability to support temporally overlapping sidelink transmissions using a number of beams, a capability to support temporally overlapping sidelink transmissions using a number of sidelink transmissions per beam, or both. The network (e.g., a base station 105) may transmit first and second signaling that schedules temporally overlapping first and second sidelink transmissions based on first and second grants (e.g., configured grants). The UE 115 may transmit at least one of the first sidelink transmission or the second sidelink transmission based on the UE 115's capability to support a number of temporally overlapping sidelink transmissions, whether the first sidelink transmission and the second sidelink transmission are associated with a same beam or different beams, and a frequency relationship between the first sidelink transmission and the second sidelink transmission.

In some examples, the respective configured grants may indicate a priority associated with each of the first sidelink transmission and the second sidelink transmission. If the UE 115 is not capable of transmitting the first sidelink transmission or the second sidelink transmission concurrently, the UE 115 may transmit the sidelink transmission associated with the higher priority. In some examples, the configured grants may schedule the first and second sidelink transmissions with overlapping frequency resources. In some examples, the UE 115 may resolve the frequency overlap by reallocating the overlapping frequency resources between the overlapping sidelink transmissions. The UE 115 may reallocate the overlapping frequency resources based on a priority associated with the first and second sidelink transmissions or based on the resource allocation associated with the first and second sidelink transmissions.

Figure 2:
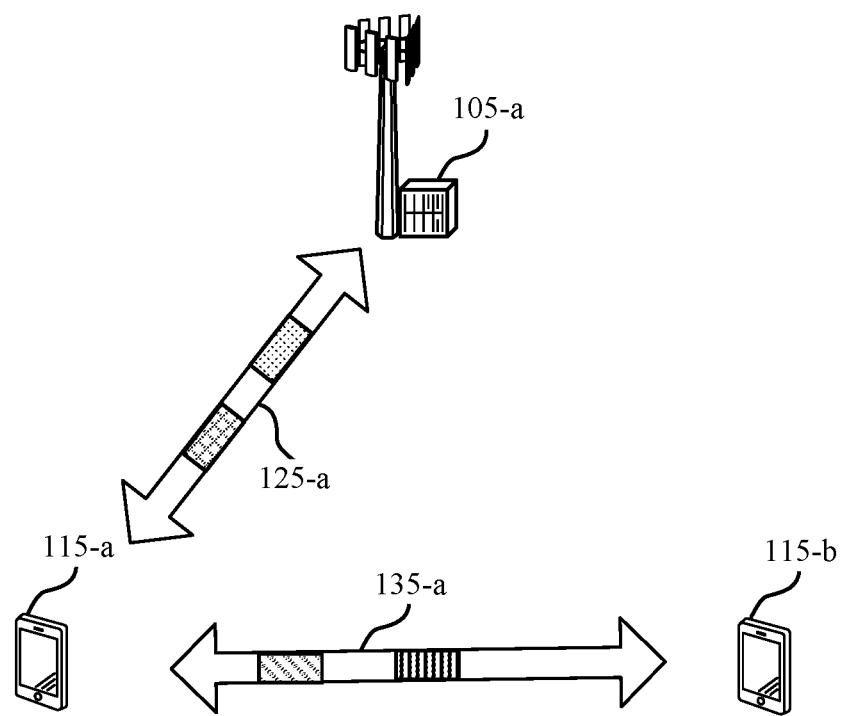
FIG. 2 illustrates an example of a wireless communications system that supports overlapping sidelink grant and beam management in accordance with aspects of the present disclosure.
Figure 2:
Figure 2:
Figure 2:
Figure 2:

FIG. 2 illustrates an example of a wireless communications system 200 that supports overlapping sidelink grant and beam management in accordance with aspects of the present disclosure. In some examples, the wireless communications system 200 may implement aspects of wireless communications system 100. The wireless communications system 200 may include UEs 115-a and 115-b, which may be examples of UEs 115 as described herein. The wireless communications system 200 may include a base stations 105-a, which may be an example of a base station 105 as described herein.

The first UE 115-a may communicate with the base station 105-a using a communication link 125-a, which may be an example of an NR or LTE link between the first UE 115-a and the base station 105-a. The communication link 125-a may include a bi-directional link that enables both uplink and downlink communication. For example, the first UE 115-a may transmit uplink signals, such as uplink control signals or uplink data signals, to the base station 105-a using the communication link 125-a and the base station 105-a may transmit downlink signals, such as downlink control signals or downlink data signals, to the first UE 115-a using the communication link 125-a. In some examples, the base station 105-a may communicate with the UE 115-a over the communication link 125-a using directional communications techniques (e.g., beamforming techniques). For example, the base station 105-a may communicate with the UE 115-a via one or more beams.

The first UE 115-a may communicate with the second UE 115-b using a sidelink communication link 135-a. The sidelink communication link 135-a may include a bi-directional link that enables the UE 115-a to transmit signals to and receive signals from the UE 115-b. In some examples, the base station 105-a may configure resources for the sidelink communication link 135-a. In some examples, the UE 115-a may communicate with the UE 115-b over the sidelink communication link 135-a using directional communications techniques (e.g., beamforming techniques). For example, the UE 115-a may communicate with the UE 115-b via one or more beams.

In some wireless communications systems, such as wireless communications system 200, the UEs 115 may communicate in sidelink mode 1. In sidelink mode 1, sidelink transmissions between the UEs 115 may be scheduled by a base station 105-a. The UE 115-a, may receive a DCI message (e.g., DCI format 3_0) which schedules sidelink transmissions. The DCI may also configure sidelink parameters such as a resource pool index (e.g., via sl-Tx-PoolScheduling), where the number of bits indicating the resource pool index may depend on a number of available resource pools. Another configured parameter may be a time gap between the DCI and an scheduled sidelink transmission, which may be indicated with 3 bits by sl-DCI-ToSL-Trans. The DCI may also configure a HARQ process number using 4 bits, a new data indicator using 1 bit, and a lowest subchannel index for the resource allocation for the sidelink transmissions. The DCI may also configure the sidelink control information (SCI) 1-A format fields including the time domain resource allocation (TDRA) and frequency domain resource allocation (FDRA). The DCI may also configure the physical sidelink feedback channel to HARQ feedback timing by sl-PSFCH-ToPUCCH. The DCI may also configure a physical uplink control channel (PUCCH) resource indicator using 3 bits. The DCI may also include a configuration index which may include 0 bits if the DCI configures dynamic grant (DG) only monitoring or 3 bits otherwise. The DCI may also include 2 bits to indicate a sidelink assignment index and additional padding bits.

The wireless communications system 200 may support sidelink configured grant communications (e.g., CG-PSSCHs) in which the base station 105-a schedules the UE 115-a to transmit sidelink messages (e.g., to the UE 115-b or to multiple UEs 115) within sets of configured sidelink occasions. The wireless communications system 200 may support multiple types of uplink configured grant communications, including uplink configured grant Type 1 and uplink configured grant Type 2. A configured grant message (e.g., CG-PSSCH message) may refer to a message transmitted within a transmission occasion configured via upper layer (e.g., RRC) signaling as part of a recurring (e.g., periodic) set of transmission occasions, where the particular transmission occasion within which the configured grant message is transmitted is activated via upper layer (e.g., RRC) signaling, lower layer (e.g., DCI) signaling, or both, and where one or more transmission parameters for the configured grant message are configured via the upper layer signaling.

In the context of Type 1 sidelink configured grants, the base station 105-a may configure a set of transmission occasions for CG-PSSCH messages via RRC signaling (e.g., over the communication link 125-a). With Type 1, the configured grant is activated via the RRC signaling which configures the transmission occasions. That is, the configured grant is active once the transmission occasions are configured. Moreover, RRC signaling may be used to deactivate the configured grant, where the transmission occasions of the configured grant are unusable once the configured grant is deactivated. In the context of Type 1 configured grants, all transmission parameters for the transmission occasions may be configured via RRC signaling. That is, RRC signaling which activates the configured grant/transmission occasions may indicate parameters associated with the transmission occasions, including a periodicity, an offset, a modulation and coding scheme (MCS), a K value, a PC, a demodulation reference signal (DMRS) configuration, or any combination thereof.

Comparatively, in the context of Type 2 sidelink configured grants, the base station 105-*a* may configure a set of transmission occasions for CG-PSSCH messages via RRC signaling, and may subsequently activate the grant via subsequent control signaling (e.g., DCI signaling). In other words, Type 2 configured grants may be activated via DCI such that the grant/transmission occasions are activated once an "activation DCI message" is received. Activation DCI messages may include a cyclic redundancy check (CRC) portion which is scrambled with configured scheduling-radio network temporary identifier (CS-RNTI), with a new data indicator (NDI) field or a redundancy version (RV) field or both set to zero for validation (e.g., NDI=0, RV=0, or both). Type 2 configured grants may be deactivated once a "deactivation DCI message" is received. In the context of Type 2 configured grants, transmission parameters for the transmission occasions (e.g., periodicity, offset, MCS, K, PC, DMRS configuration) may be configured via the RRC signaling which configures the transmission occasions, via the activation DCI message, or both. That is, some parameters may be RRC-configured, while other parameters are indicated via the DCI message which activates the transmission occasions.

In addition to the use of configured grants which schedule PSSCH messages within sets of configured transmission occasions, the wireless communications system 200 may additionally support dynamic scheduling (e.g., dynamic grants) which enable the base station 105-*a* to dynamically schedule the UE 115-*a* to transmit PSSCH messages via DCI messages that dynamically schedule a dynamic grant PSSCH (DG-PSSCH) messages. As compared to configured grants, in which the resources for PSSCH messages are configured via RRC signaling, resources for DG-PSSCH messages may be dynamically indicated via the DCI message which schedules the respective DG-PSSCH. As such, a dynamic grant message (e.g., DG-PSSCH message) may refer to a message which is dynamically scheduled via control signaling from the network (e.g., via DCI 3_0) and which does not require explicit or implicit activation after scheduling. Moreover, as compared to configured grants which may schedule and activate sets of transmission occasions, a dynamic grant may schedule a single dynamically scheduled message (e.g., each DG-PSSCH message may be scheduled by a single DCI).

In some examples, the base station 105-*a* may schedule up to some quantity (e.g., 8) sidelink configured grants for the UE 115-*a*. Periodic sidelink grants may schedule periodic sidelink transmissions for periodic sidelink traffic. The base station 105-*a* may configure HARQ process number parameters and periodicity for the configured grants. The base station 105-*a* may also configure a HARQ process ID calculation for the configured grants (e.g., HARQ Process ID=[floor(CURRENT_slot/PeriodicitySL)] modulo sl-NROfHARQ-Processes+sl-HARQ-ProcID-offset).

In some examples, the wireless communications system 200 may be a cellular vehicle-to-everything (C-V2X) system. To receive a sidelink transmission (e.g., a sidelink packet), a receiving UE 115-*b* may perform blind decoding in all configured sidelink subchannels, where the number of subchannels may be within a range of 1-27 subchannels such that blind decoding all subchannels may be feasible. A physical sidelink control channel (PSCCH) packet and a PSSCH packet may be transmitted within a same slot. In some examples, PSSCH may occupy $N_{subchannel}^{SL}$ contiguous subchannels. PSCCH may occupy up to one subchannel with the lowest subchannel index. At a first stage, a transmitting UE 115-*a* may transmit SCI in PSCCH containing information about the PSSCH bandwidth and resource reservations in future slots. At a second stage, the receiving UE 115-*b* may locate and decode the SCI after decoding PSCCH. A source identifier and a destination identifier may be used to distinguish whether the packet is for the receiving UE 115-*b* and that the packet is transmitted from the UE 115-*a*. In C-V2X, subchannel size may be relatively large (e.g., at least 10 resource blocks). C-V2X may involve a UE 115-*b* to decoding all transmissions and involve blind decoding of all subchannels.

In sidelink mode 2, SCI format 1_0 in PSCCH may schedule sidelink transmissions. The SCI format 1_0 may include a FDRA, which may be indicated by $$\left\lceil \log \frac{N_{subchannel}^{SL}(N_{subchannel}^{SL}+1)}{2} \right\rceil$$

bits for 2 reservations or $$\left\lceil \log \frac{N_{subchannel}^{SL}(N_{subchannel}^{SL}+1)(2N_{subchannel}^{SL}+1)}{6} \right\rceil$$

bits for 3 reservations. The SCI format 1_0 may include a TDRA, which may be indicated by 5 bits for 2 reservations or 9 bits for 3 reservations. For SCI received in a given slot i, a first reservation may be in the same slot i, a second reservation may be within a slot x, where i<x≤31, and a third reservation may be within a slot y, where x<y≤31. The reservations may be PSSCH transmissions, and after a time gap, the receiving UE 115-*b* may transmit feedback via a physical sidelink feedback channel (PSFCH).

PSCCH may be configured to occupy a set of physical resource blocks (PRBs) (e.g., 10, 12, 15, 20, or 25 PRBs) within a single subchannel. A PSCCH duration may be configured to 2 or 3 symbols. A subchannel may occupy a set of PRBs (e.g., 10, 15, 20, 25, 50, 75, or 100 PRBs). A number of subchannels may be 1-27 in a resource pool. PSCCH size may be fixed for a resource pool (e.g., may be 10% to 100% of one subchannel (for the first 2 or 3 symbols). PSSCH may occupy at least 1 subchannel and may contain second stage SCI.

In C-V2X, sidelink communications may be mode 1 (e.g., where the base station 105-*a* assigns transmission resources for sidelink communications through DCI 3_0) or mode 2 (where a transmitting UE 115-*a* autonomously determines resources for sidelink communications). In mode 1, MCS may be determined by the transmitting UE 115-*a* within a limit set by the base station 105-*a*. In mode 2, the transmitting UE 115-*a* performs channel sensing by blindly decoding all PSSCH channels and finding which resources are reserved by other sidelink transmissions. The transmitting UE 115-*a* may report available resources to an upper layer at the transmitting UE 115-*a* and the upper layer may determine resource usage for sidelink transmissions from the UE 115-*a*.

In some examples, the wireless communications system 200 may be an industrial internet of things (IoT) system. In industrial IoT, sidelink communications may enable direct communications between programmable logical controllers (PLC) and sensor/actuators (SAs). A wireless PLC may be flexible and include a simple deployment. A wireless PLC may control 20-50 SAs. A wireless PLC may have tight latency (e.g., 1-2 ms) and ultra-reliability ($10^{-6}$ error rate) targets. Unlink direct communications (e.g., via sidelink), communication between a wireless PLC and the SAs through a base station (e.g., base station 105-a) may involve multiple over the air transmissions, affecting the latency and reliability of the communications.

Industrial IoT traffics may be deterministic and use relatively small packet sizes (e.g., 32-256 Bytes). Accordingly, the bandwidth association with industrial IoT communications may be relatively low, and 2 resource blocks may be sufficient for some cases. Particular SAs may include capability constraints in terms of bandwidth and processing power. Overall bandwidth for industrial IoT may be large with dedicated frequency bands, unlicensed bands, or any combination thereof. An SA may not detect or monitor all transmissions. In an industrial IoT system, PSCCH may have to meet industrial IoT targets. Industrial IoT may include blockages and interferences (e.g., from power equipment) which may result in challenging radio frequency environments.

In sidelink communications, a transmitting UE 115-a may transmit SCI to schedule sidelink transmissions, to configure parameters associated with sidelink transmissions, or both. SCI 1-A may be decoded by intended receiving UEs 115 (e.g., UE 115-b) and other sidelink UEs 115 to allow channel sensing and avoid resource collision. SCI 1-A may be transmitted in PSCCH. SCI 1-A may include 3 bits indicating a priority, and a number of bits indicating an FDRA for transmission reservations, where the number of bits depends on the number of slot reservations and the number of subchannels. SCI 1-A may include 5 or 9 bits to indicate a TDRA for 2 or 3 reservations, respectively. SCI 1-A may include a number of bits indicating a resource reservation period, where the number of bits depends on a number of allowed periods. SCI 1-A may also include a number of bits indicating a DMRS pattern, where the number of bits depends on a number of configured patterns. SCI 1-A may a include 2 bits indicating an SCI 2 format. SCI 1-A may include 2 bits indicating a beta offset for SCI 2 rate matching. SCI 1-A may include 1 bit indicating one or two data layers for a DMRS port. SCI 1-A may also include 5 bits indicating an MCS, and 0-2 bits indicating an additional MCS table. SCI 1-A may include 0 or 1 bit indicating a PSFCH overhead indicator. SCI 1-A may also include a number of reserved bits.

SCI 2 may be transmitted in PSCCH, and may be front-loaded. SCI 2 may be intended for reception by receiving UEs 115 (e.g., UE 115-b) for decoding a PSSCH transmission. SCI 2 may include a number of bits indicating a HARQ ID, where the number of bits depends on a number of HARQ processes. SCI 2 may include 1 bit indicating an NDI. SCI 2 may include 2 bits indicating an RV identifier. SCI 2 may include 8 bits indicating a source identifier. SCI 2 may include 16 bits indicating a destination identifier. SCI 2 may include 1 bit enabling or disabling HARQ. SCI 2 may include 2 bits indicating a cast type (e.g., broadcast, groupcast, unicast). SCI 2 may include 1 bit indicating a channel state information request. The cast type and channel state information fields may be SCI 2-A format only fields. SCI 2 may include 12 bits indicating a zone identifier and 4 bits indicating a communication range.

In some cases, sidelink grants from the base station 105-a may result in collisions between temporally overlapping sidelink transmissions (e.g., PSSCH transmissions). For example, collision types may include DG-DG collisions (collisions between transmissions scheduled by dynamic grants), DG-CG collisions (collisions between at least one transmission scheduled by a dynamic grant and at least one transmission scheduled by a configured grant), or CG-CG collisions (collisions between transmissions scheduled by configured grants). In some examples, the network (e.g., the base station 105-a) may be unable to avoid scheduling configured grants that result in a CG-CG collisions.

A UE 115-a may have a capability to support up to some number of temporally overlapping sidelink transmissions. The capability may include a capability to support temporally overlapping sidelink transmissions using up to some number of beams, a capability to support temporally overlapping sidelink transmissions using up to some number of sidelink transmissions per beam, or both.

The base station 105-a may transmit first signaling 205 that schedules a first sidelink transmission 215 (e.g., based on a configured grant) and second signaling 210 that schedules a second sidelink transmission 220 (e.g., based on a second configured grant), where the second sidelink transmission 220 at least partially overlaps in time with the first sidelink transmission 215. For example, the first sidelink transmission 215 and the second sidelink transmission 220 may each be a CG-PSSCH message. The UE 115-a may transmit at least one of the first sidelink transmission 215 or the second sidelink transmission 220 to the UE 115-b based on the UE 115-a's capability to support a number of temporally overlapping sidelink transmissions, whether the first sidelink transmission 215 and the second sidelink transmission 220 are associated with a same beam or different beams, and a frequency relationship between the first sidelink transmission 215 and the second sidelink transmission 220.

In some examples, the respective configured grants, the first signaling 205, or the second signaling 210 may indicate a priority associated with each of the first sidelink transmission 215 and the second sidelink transmission 220. If the UE 115-a is not capable of transmitting the first sidelink transmission 215 and the second sidelink transmission 220 concurrently, the UE 115-a may transmit the sidelink transmission associated with the higher priority. In some examples, the respective configured grants may schedule the first sidelink transmission 215 and the second sidelink transmission 220 with overlapping frequency resources. In some examples, the UE 115-a may resolve the frequency overlap by reallocating the overlapping frequency resources between the first sidelink transmission 215 and the second sidelink transmission 220. The UE 115-a may reallocate the overlapping frequency resources based on a priority associated with the first sidelink transmission 215 and the second sidelink transmission 220 or based on the resource allocation associated with the first sidelink transmission 215 and the second sidelink transmission 220.

Figure 3:
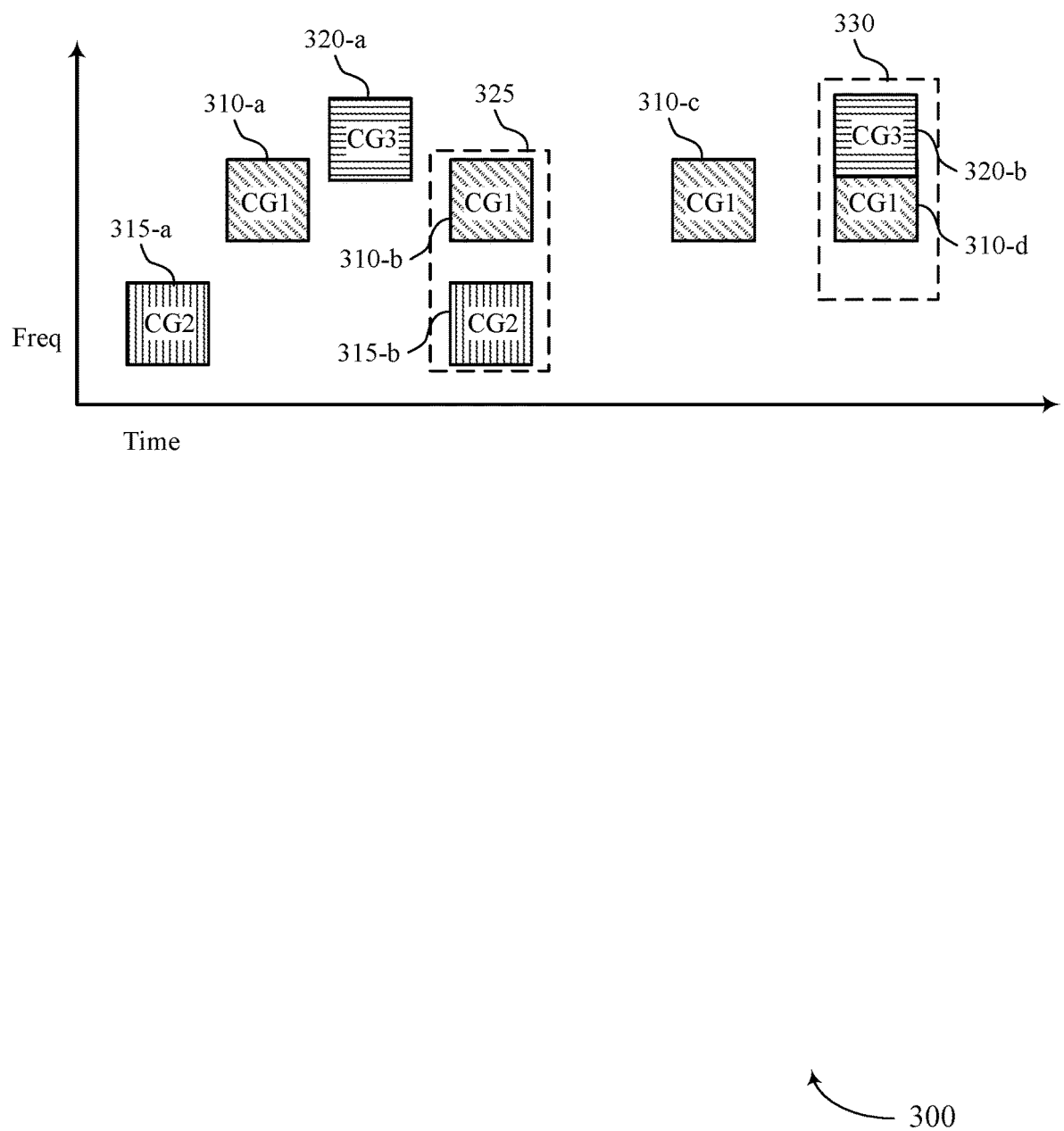
FIG. 3 illustrates an example of a resource configuration that supports overlapping sidelink grant and beam management in accordance with aspects of the present disclosure.

FIG. 3 illustrates an example of a resource configuration 300 that supports overlapping sidelink grant and beam management in accordance with aspects of the present disclosure. In some examples, the resource configuration 300 may be implemented by or may implement aspects of the wireless communications system 100 or 200.

As described herein, the network may configure multiple sets of sidelink transmission occasions via grants. (e.g., via dynamic grants or configured grants). For example, the resource configuration 300 illustrates three sets of sidelink transmissions occasions 310, 315, and 320, scheduled by a first configured grant, a second configured grant, and a third configured grant respectively. Although illustrated as configured grants in the examples of FIGS. 3 and 4, alternatively, in some examples, any of the transmission occasions 310, 315, or 320 may be scheduled by dynamic grants. As described herein, two or more of the transmission occasions 310, 315, or 320 may result in collisions. For example, collision types may include DG-DG collisions, DG-CG collisions, or CG-CG collisions. Further, although the examples of FIGS. 3 and 4 show collisions among two transmission occasions, techniques described herein may be extended to collisions among any quantity of transmission occasions.

The sidelink transmission occasions 310 scheduled according to a first configured grant may be associated with the same set of frequency resources across the sidelink transmission occasions 310. The sidelink transmission occasions 315 scheduled according to a second configured grant may be associated with the same set of frequency resources across the sidelink transmission occasions 315. The sidelink transmission occasions 320 scheduled according to a third configured grant may be associated with the same set of frequency resources across the sidelink transmission occasions 320.

In some examples, two or more sidelink transmissions may be scheduled for simultaneous or overlapping transmission (e.g., in the same slot). For example, sidelink transmission 310-b and sidelink transmission 315-b may be scheduled in the same slot 325. In some examples, sidelink transmissions may be scheduled for simultaneous or overlapping transmission and associated with overlapping frequency resources. For example, sidelink transmission 320-b and sidelink transmission 310-d may be scheduled in the same slot 330 and may be associated with an overlapping set of frequency resources. As described herein, depending on the UE 115's capability to support concurrent sidelink transmissions, the UE 115 may transmit the simultaneous or overlapping sidelink transmissions (e.g., sidelink transmission 310-b and sidelink transmission 315-b scheduled in slot 325, sidelink transmission 320-b and sidelink transmission 310-d in slot 330, or any combination thereof).

Figure 4:
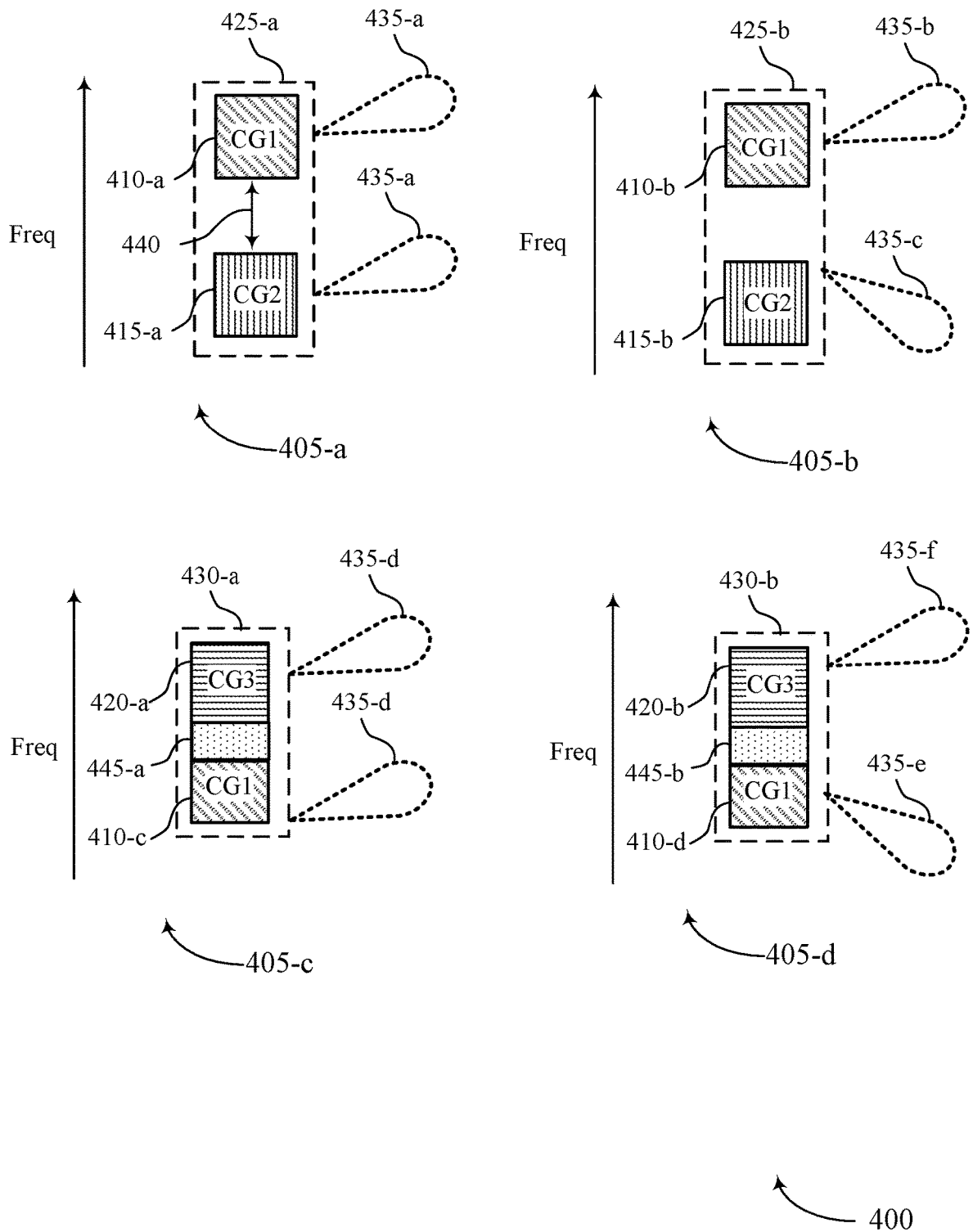
FIG. 4 illustrates an example of a resource configuration that supports overlapping sidelink grant and beam management in accordance with aspects of the present disclosure.

FIG. 4 illustrates an example of a resource configuration 400 that supports overlapping sidelink grant and beam management in accordance with aspects of the present disclosure. In some examples, the resource configuration 400 may be implemented by or may implement aspects of the wireless communications system 100 or 200.

Resource configuration 405-a illustrates an example where a UE 115 receives first signaling scheduling a first sidelink transmission 410-a based on a first configured grant and second signaling scheduling a second sidelink transmission 415-a based on a second configured grant, where the second sidelink transmission 415-a at least partially overlaps in time with the first sidelink transmission 410-a. For example, the first sidelink transmission 410-a and the second sidelink transmission 415-a may be scheduled in the same slot 425-a. The first sidelink transmission 410-a and the second sidelink transmission 415-a may be associated with the same beam 435-a. The first sidelink transmission 410-a may be associated with a first set of frequency resources and the second sidelink transmission 415-a may be associated with a second set of frequency resources. The first set of frequency resources and the second set of frequency resources may be separated by a frequency separation 440. For example, the UE 115 may receive indications that the first sidelink transmission 410-a and the second sidelink transmission 415-a are associated with the same beam 435-a and the respective sets of resources via the respective configured grants or the respective first and second signaling. In some examples, the UE 115 may transmit the first sidelink transmission 410-a via the beam 435-a using the first set of frequency resources and the second sidelink transmission 415-a via the beam 435-a using the second set of frequency resources if the frequency separation 440 is smaller than or equal to a threshold. In some examples, the UE 115 may receive an indication from the network of the frequency separation threshold. In some examples, the UE 115-a may transmit the first sidelink transmission 410-a via the beam 435-a using the first set of frequency resources and refrain from transmitting the second sidelink transmission 415-a if the frequency separation 440 is greater than or equal to the threshold.

In some examples, the UE 115 may receive, from the network, an indication that the first sidelink transmission 410-a is associated with a first priority level and an indication that the second sidelink transmission 415-a is associated with a second priority level lower than the first priority level. For example, the UE 115 may receive indications of the respective priorities via the respective configured grants or the respective first and second signaling. The UE 115 may transmit the first sidelink transmission 410-a via the beam 435-a using the first set of frequency resources and refrain from transmitting the second sidelink transmission 415-a based on the second priority level being lower than the first priority level.

Resource configuration 405-b illustrates an example where a UE 115 receives first signaling scheduling a first sidelink transmission 410-b based on a first configured grant and second signaling scheduling a second sidelink transmission 415-b based on a second configured grant, where the second sidelink transmission 415-b at least partially overlaps in time with the first sidelink transmission 410-b. For example, the first sidelink transmission 410-b and the second sidelink transmission 415-b may be scheduled in the same slot 425-b. The first sidelink transmission 410-b may be associated with a first beam 435-b and the second sidelink transmission 415-b may be associated with a second beam 435-c. The first sidelink transmission 410-b may be associated with a first set of frequency resources and the second sidelink transmission 415-b may be associated with a second set of frequency resources. The UE 115 may receive indications that the first sidelink transmission 410-b and the second sidelink transmission 415-b are associated with the respective beams 435-b and 435-c and the respective sets of resources via the respective configured grants or the respective first and second signaling.

The UE 115 may transmit the first sidelink transmission 410-b via the first beam 435-b and the second sidelink transmission 415-b via the second beam 435-c if the UE 115 is capable of transmitting two sidelink transmissions over two different beams concurrently. If the UE 115 is not capable of transmitting two sidelink transmissions over two different beams concurrently, the UE 115 may transmit the first sidelink transmission 410-b via the first beam 435-b and refrain from transmitting the second sidelink transmission 415-b.

In some examples, the UE 115 may receive, from the network, an indication that the first sidelink transmission 410-b is associated with a first priority level and an indication that the second sidelink transmission 415-b is associated with a second priority level lower than the first priority level. For example, the UE 115 may receive indications of the respective priorities via the respective configured grants or the respective first and second signaling. The UE 115 may transmit the first sidelink transmission 410-b via the first beam 435-b using the first set of frequency resources and refrain from transmitting the second sidelink transmission 415-b based on the second priority level being lower than the first priority level.

Resource configuration 405-c illustrates an example where a UE 115 receives first signaling scheduling a first sidelink transmission 410-c based on a first configured grant and second signaling scheduling a second sidelink transmission 420-a based on a second configured grant, where the second sidelink transmission 420-a at least partially overlaps in time with the first sidelink transmission 410-c. For example, the first sidelink transmission 410-c and the second sidelink transmission 420-a may be scheduled in the same slot 430-a. The first sidelink transmission 410-c and the second sidelink transmission 420-a may be associated with the same beam 435-d. The first sidelink transmission 410-c may be associated with a first set of frequency resources including a first subset of frequency resources and a second subset of frequency resources 445-a and the second sidelink transmission 420-a may be associated with a second set of frequency resources including the second subset of frequency resources 445-a and a third subset of frequency resources. For example, the UE 115 may receive indications that the first sidelink transmission 410-c and the second sidelink transmission 420-a are associated with the same beam 435-d and the respective sets of frequency resources via the respective configured grants or the respective first and second signaling.

In some examples, the UE 115 may transmit the first sidelink transmission 410-c using the first set of frequency resources and the beam 435-d and transmit the second sidelink transmission 420-a using the third subset of frequency resources and the beam 435-d.

In some examples, the UE 115 may receive, from the network, an indication that the first sidelink transmission 410-c is associated with a first priority level and an indication that the second sidelink transmission 420-a is associated with a second priority level. In some examples, the second priority level may be lower than the first priority level. For example, the UE 115 may receive indications of the respective priorities via the respective configured grants or the respective first and second signaling. The UE 115 may transmit the first sidelink transmission 410-c using the first set of frequency resources and the beam 435-d and transmit the second sidelink transmission 420-a using the third subset of frequency resources and the beam 435-d based on the second priority level being lower than the first priority level.

In some examples, the UE 115 may transmit the first sidelink transmission 410-c using the first subset of frequency resources and a first portion of the second subset of frequency resources 445-a and the second sidelink transmission 420-a using the third subset of frequency resources and a second portion of the second subset of frequency resources 445-a (e.g., the UE 115 may reallocate the second subset of frequency resources 445-a between the first sidelink transmission 410-c and the second sidelink transmission 420-a). In some examples, a size of the first portion and a size of the second portion are based on a relationship between the first priority level and the second priority level associated with the first sidelink transmission 410-c and the second sidelink transmission 420-a. In some examples, the first portion and the second portion have respective sizes that are based on a first block error rate target for the first sidelink transmission 410-c, a second block error rate target for the second sidelink transmission 420-a, a channel state information condition, a transmission power capability of the UE 115, or a combination thereof. In some examples, the first portion and the second portion have respective sizes that are based at least in part on a size relationship between the first set of frequency resources and the second set of frequency resources. For example, the first set of frequency resources may occupy Y1 frequency resources and the second set of frequency resources may occupy Y2 frequency resources. The UE 115 may puncture the frequency resources for the first sidelink transmission 410-c and the second sidelink transmission 420-a based on the relationship between Y1 and Y2. For example, the UE 115 may puncture x % of the Y1 resources and the same x % of the Y2 resources. In some examples, the values of x % Y11 and x % Y2 may be rounded to the nearest smallest resource allocation unit (e.g., a subchannel). In some examples, the UE 115 may puncture the set of frequency resources with a larger resource allocation. In some examples, the UE 115 may not puncture the set of frequency resources with a smaller resource allocation.

Resource configuration 405-d illustrates an example where a UE 115 receives first signaling scheduling a first sidelink transmission 410-d based on a first configured grant and second signaling scheduling a second sidelink transmission 420-b based on a second configured grant, where the second sidelink transmission 420-b at least partially overlaps in time with the first sidelink transmission 410-d. For example, the first sidelink transmission 410-d and the second sidelink transmission 420-b may be scheduled in the same slot 430-b. The first sidelink transmission 410-d may be associated with a first beam 435-e and the second sidelink transmission 420-b may be associated with a second beam 435-f. The first sidelink transmission 410-d may be associated with a first set of frequency resources including a first subset of frequency resources and a second subset of frequency resources 445-b and the second sidelink transmission 420-b may be associated with a second set of frequency resources including the second subset of frequency resources 445-b and a third subset of frequency resources. For example, the UE 115 may receive indications that the first sidelink transmission 410-d and the second sidelink transmission 420-b are associated with the respective beams 435-e and 435-f and the respective sets of resources via the respective configured grants or the respective first and second signaling.

If the UE 115 is not capable of transmitting two sidelink transmissions over two different beams concurrently, or if the beam separation between the first beam 435-e and the second beam 435-f is less than or equal to a threshold to avoid interference (which may be configured by the network), the UE 115 may transmit the first sidelink transmission 410-d via the first beam 435-e using the first set of frequency resources and refrain from transmitting the second sidelink transmission 420-b.

In some examples, the UE 115 may receive, from the network, an indication that the first sidelink transmission 410-d is associated with a first priority level and an indication that the second sidelink transmission 420-b is associated with a second priority level. In some examples, the second priority level may be lower than the first priority level. For example, the UE 115 may receive indications of the respective priorities via the respective configured grants or the respective first and second signaling. The UE 115-c may transmit the first sidelink transmission 410-d via the first beam 435-e using the first set of frequency resources and refrain from transmitting the second sidelink transmission 420-*b* based on the second priority level being lower than the first priority level.

In some examples, the UE 115 may transmit the first sidelink transmission 410-*d* via the first beam 435-*e* and the second sidelink transmission 420-*b* via the second beam 435-*f* if the UE 115 is capable of transmitting two sidelink transmissions over two different beams concurrently and if the beam separation between the first beam 435-*e* and the second beam 435-*f* is greater than a threshold to avoid interference (which may be configured by the network). The UE 115 may transmit the first sidelink transmission 410-*d* using the first set of frequency resources and the first beam 435-*e* and transmit the second sidelink transmission 420-*b* using the third subset of frequency resources and the second beam 435-*f*. In some examples, the UE 115 may transmit the first sidelink transmission 410-*d* using the first set of frequency resources and the beam 435-*e* and transmit the second sidelink transmission 420-*b* using the third subset of frequency resources and the beam 435-*f* based on the second priority level being lower than the first priority level.

In some examples, the UE 115 may transmit the first sidelink transmission 410-*d* using the first subset of frequency resources and a first portion of the second subset of frequency resources 445-*a* and the second sidelink transmission 420-*b* using the third subset of frequency resources and a second portion of the second subset of frequency resources 445-*b* (e.g., the UE 115 may reallocate the second subset of frequency resources 445-*b* between the first sidelink transmission 410-*d* and the second sidelink transmission 420-*b*). In some examples, a size of the first portion and a size of the second portion are based on a relationship between the first priority level and the second priority level associated with the first sidelink transmission 410-*d* and the second sidelink transmission 420-*b*. In some examples, the first portion and the second portion have respective sizes that are based on a first block error rate target for the first sidelink transmission 410-*d*, a second block error rate target for the second sidelink transmission 420-*b*, a channel state information condition, a transmission power capability of the UE 115, or a combination thereof. In some examples, the first portion and the second portion have respective sizes that are based at least in part on a size relationship between the first set of frequency resources and the second set of frequency resources. For example, the first set of frequency resources may occupy Y1 frequency resources and the second set of frequency resources may occupy Y2 frequency resources. The UE 115 may puncture the frequency resources for the first sidelink transmission 410-*d* and the second sidelink transmission 420-*b* based on the relationship between Y1 and Y2. For example, the UE 115 may puncture x % of the Y1 resources and the same x % of the Y2 resources. In some examples, the values of x % Y11 and x % Y2 may be rounded to the nearest smallest resource allocation unit (e.g., a subchannel). In some examples, the UE 115 may puncture the set of frequency resources with a larger resource allocation. In some examples, the UE 115 may not puncture the set of frequency resources with a smaller resource allocation.

Figure 5:
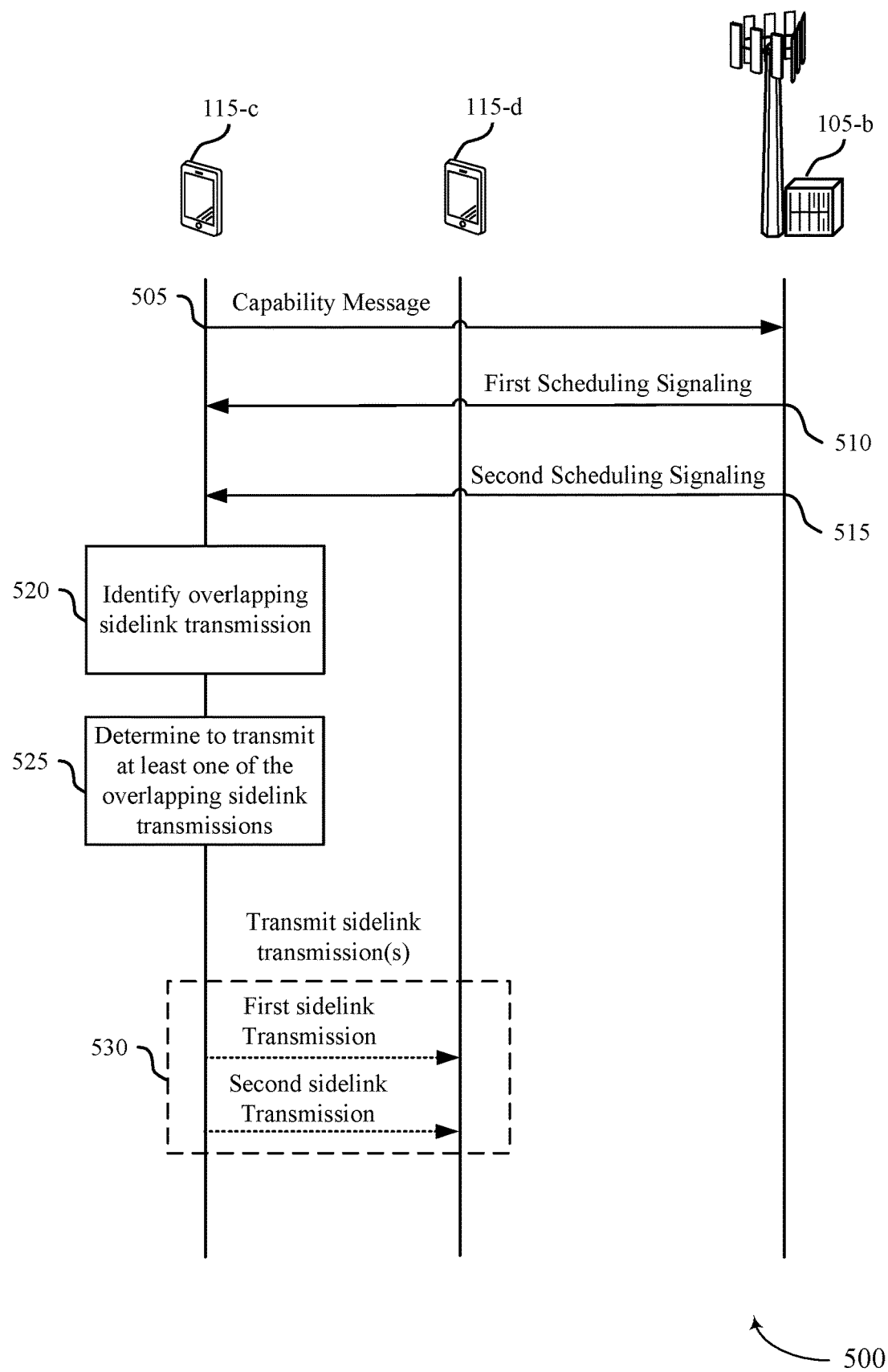
FIG. 5 illustrates an example of a process flow that supports overlapping sidelink grant and beam management in accordance with aspects of the present disclosure.

FIG. 5 illustrates an example of a process flow 500 that supports overlapping sidelink grant and beam management in accordance with aspects of the present disclosure. In some examples, the process flow 500 may be implemented by or may implement aspects of the wireless communications system 100 or 200. The process flow 500 may include a UE 115-*c* and a UE 115-*d*, which may be examples of a UE 115 as described herein. The process flow 500 may also include a base station 105-*b*, which may be an example of the base station 105 as described herein. In the following description of the process flow 500, the operations between the base station 105-*b*, the UE 115-*c*, and the UE 115-*d* may be transmitted in a different order than the example order shown, or the operations performed by the base station 105-*b*, the UE 115-*c*, and the UE 115-*d* may be performed in different orders or at different times. Some operations may also be omitted from the process flow 500, and other operations may be added to the process flow 500.

At 505, the UE 115-*c* may transmit, to the base station 105-*b*, a report indicating a capability of the UE 115-*c* to transmit a quantity of one or more of temporally overlapping sidelink channel transmissions. In some examples, the capability may include a capability of the UE 115-*c* to transmit a first quantity of one or more beams concurrently, a second capability of the UE 115-*c* to transmit a quantity of one or more concurrent sidelink transmissions per beam, a third capability of the UE 115-*c* to transmit a quantity of concurrent sidelink transmissions regardless of beam allocation, or any combination thereof.

At 510, the UE 115-*c* may receive, from the base station 105-*b*, first signaling that schedules a first sidelink transmission (e.g., to the UE 115-*d*) based on a first grant (e.g., a first configured grant).

At 515, the UE 115-*c* may receive, from the base station 105-*b*, second signaling that schedules a second sidelink transmission (e.g., to the UE 115-*d*) based on a second grant (e.g., a second configured grant).

At 520, the UE 115-*c* may identify that the second sidelink transmission at least partially overlaps in time with the first sidelink transmission.

At 525, the UE 115-*c* may determine to transmit at least one of the first sidelink transmission or the second sidelink transmission based on whether the first sidelink transmission and the second sidelink transmission are associated with a same beam or different beams and further based on a frequency relationship between the first sidelink transmission and the second sidelink transmission.

At 530, the UE 115-*c* may transmit, to the UE 115-*d*, the at least one of the first sidelink transmission or the second sidelink transmission based on the UE 115-*c*'s determination at 525.

In some examples, the UE 115-*c* may receive, from the base station 105-*b* an indication that the first sidelink transmission is associated with a first beam and a first set of frequency resources and an indication that the second sidelink transmission is associated with the first beam and a second set of frequency resources. For example, the UE 115-*c* may receive the indications with the first and second signaling received at 510 and 515 or with the respective configured grants. The UE 115-*c* may transmit the first sidelink transmission via the first beam using the first set of frequency resources and the second sidelink transmission via the first beam using the second set of frequency resources if the frequency separation is smaller than or equal to a threshold. In some examples, The UE 115-*c* may receive, from the base station 105-*b*, an indication of the threshold frequency separation. If the frequency separation is greater than the threshold, the UE 115-*a* may transmit the first sidelink transmission via the first beam using the first set of frequency resources and refrain from transmitting the second sidelink transmission. In some examples, the UE 115-*c* may receive, from the base station 105-*b*, an indication that the first sidelink transmission is associated with a first priority level and an indication that the second sidelink transmission is associated with a second priority level lower than the first priority level. For example, the UE 115-*c* may receive the indications of the respective priorities with the first and second signaling received at 510 and 515. The UE 115-*c* may transmit the first sidelink transmission via the first beam using the first set of frequency resources and refrain from transmitting the second sidelink transmission based on the second priority level being lower than the first priority level.

In some examples, the UE 115-*c* may receive, from the base station 105-*b* an indication that the first sidelink transmission is associated with a first beam and an indication that the second sidelink transmission is associated with a second beam. For example, the UE 115-*c* may receive the indications with the first and second signaling received at 510 and 515. The UE 115-*c* may transmit the first sidelink transmission via the first beam and the second sidelink transmission via the second beam if the UE 115-*c* is capable of transmitting two sidelink transmissions over two different beams concurrently. If the UE 115-*c* is not capable of transmitting two sidelink transmissions over two different beams concurrently, the UE 115-*c* may transmit the first sidelink transmission via the first beam and refrain from transmitting the second sidelink transmission. In some examples, the UE 115-*c* may receive, from the base station 105-*b*, an indication that the first sidelink transmission is associated with a first priority level and an indication that the second sidelink transmission is associated with a second priority level lower than the first priority level. For example, the UE 115-*c* may receive the indications of the respective priorities with the first and second signaling received at 510 and 515 or with the respective configured grants. The UE 115-*c* may transmit the first sidelink transmission via the first beam using the first set of frequency resources and refrain from transmitting the second sidelink transmission based on the second priority level being lower than the first priority level.

In some examples, the UE 115-*c* may receive, from the base station 105-*b* an indication that the first sidelink transmission is associated with a first set of frequency resources including a first subset of frequency resources and a second subset of frequency resources and an indication that the second sidelink transmission is associated with a second set of frequency resources including the second subset of frequency resources and a third subset of frequency resources. For example, the UE 115-*c* may receive the indications with the first and second signaling received at 510 and 515. In some examples, the UE 115-*c* may transmit the first sidelink transmission using the first set of frequency resources and transmit the second sidelink transmission using the third subset of frequency resources. In some examples, the UE 115-*c* may receive, from the base station 105-*b*, an indication that the first sidelink transmission is associated with a first priority level and an indication that the second sidelink transmission is associated with a second priority level lower than the first priority level. For example, the UE 115-*c* may receive the indications of the respective priorities with the first and second signaling received at 510 and 515 or with the configured grants. The UE 115-*c* may transmit the first sidelink transmission using the first set of frequency resources and transmit the second sidelink transmission using the third subset of frequency resources based on the second priority level being lower than the first priority level. In some examples, the UE 115-*c* may further receive, from the base station 105-*b* an indication that the first sidelink transmission is associated with a first beam and an indication that the second sidelink transmission is associated with a second beam. The UE 115-*c* may transmit the first sidelink transmission via the first beam and the second sidelink transmission via the second beam if the UE 115-*c* is capable of transmitting two sidelink transmissions over two different beams concurrently. If the UE 115-*c* is not capable of transmitting two sidelink transmissions over two different beams concurrently, the UE 115-*c* may transmit the first sidelink transmission via the first beam and refrain from transmitting the second sidelink transmission.

In some examples, the UE 115-*c* may receive, from the base station 105-*b* an indication that the first sidelink transmission is associated with a first set of frequency resources including a first subset of frequency resources and a second subset of frequency resources and an indication that the second sidelink transmission is associated with a second set of frequency resources including the second subset of frequency resources and a third subset of frequency resources. For example, the UE 115-*c* may receive the indications with the first and second signaling received at 510 and 515. The UE 115-*c* may transmit the first sidelink transmission using the first subset of frequency resources and a first portion of the second subset of frequency resources and the second sidelink transmission using the third subset of frequency resources and a second portion of the second subset of frequency resources. In some examples, the UE 115-*c* may receive, from the base station 105-*b*, an indication that the first sidelink transmission is associated with a first priority level and an indication that the second sidelink transmission is associated with a second priority level. In some examples, a size of the first portion and a size of the second portion are based on a relationship between the first priority level and the second priority level. In some examples, the first portion and the second portion have respective sizes that are based on a first block error rate target for the first sidelink transmission, a second block error rate target for the second sidelink transmission, a channel state information condition, a transmission power capability of the UE 115-*c*, or a combination thereof. In some examples, the first portion and the second portion have respective sizes that are based at least in part on a size relationship between the first set of frequency resources and the second set of frequency resources.

Figure 6:
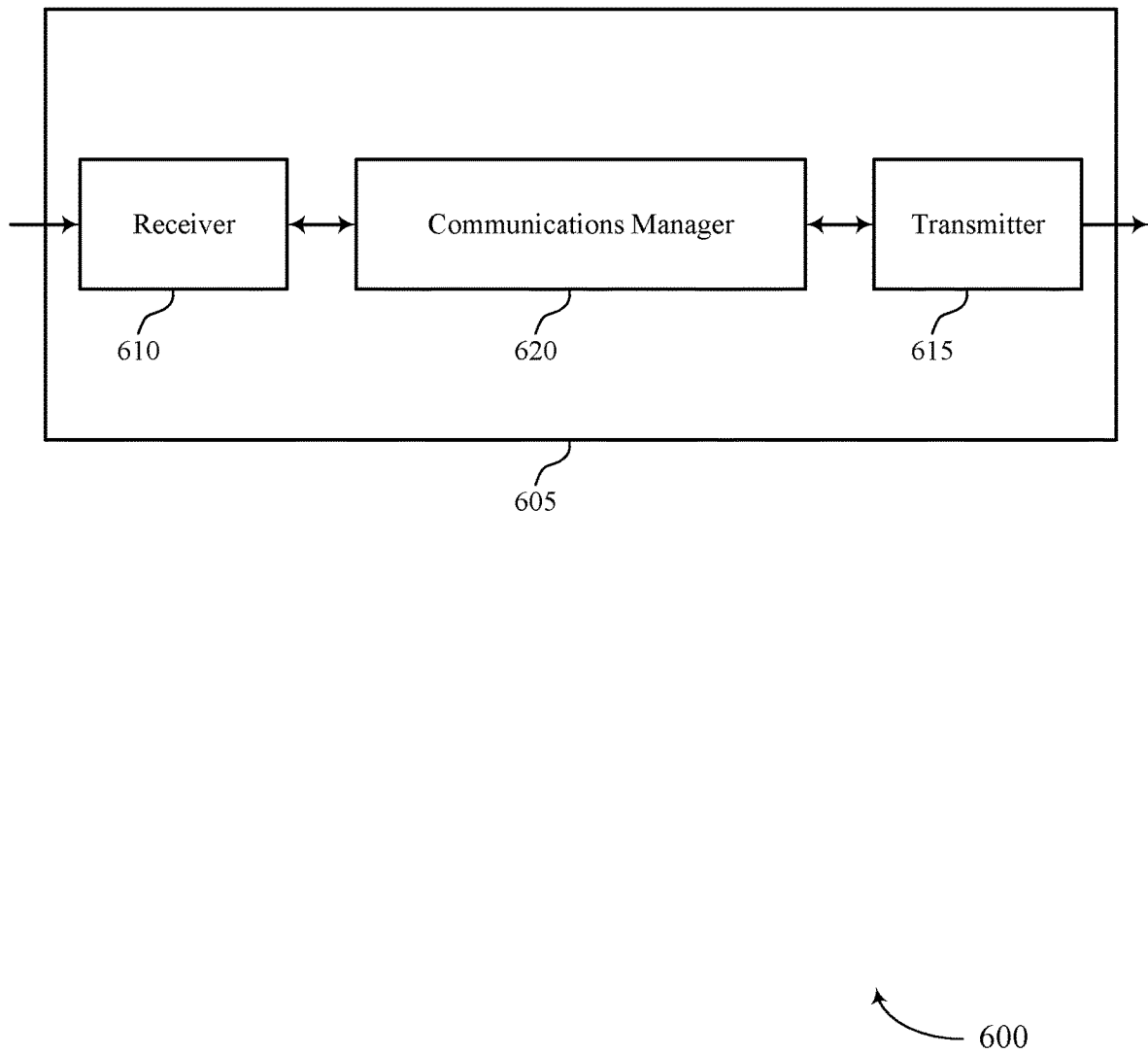
FIGS. 6 and 7 show block diagrams of devices that support overlapping sidelink grant and beam management in accordance with aspects of the present disclosure.

FIG. 6 shows a block diagram 600 of a device 605 that supports overlapping sidelink grant and beam management in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to overlapping sidelink grant and beam management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to overlapping sidelink grant and beam management). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of overlapping sidelink grant and beam management as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, first signaling that schedules a first sidelink transmission based on a first grant. The communications manager 620 may be configured as or otherwise support a means for receiving, from the base station, second signaling that schedules a second sidelink transmission based on a second grant, where the second sidelink transmission at least partially overlaps in time with the first sidelink transmission. The communications manager 620 may be configured as or otherwise support a means for transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for may support techniques for reducing collisions between overlapping PSSCH transmissions. Accordingly, techniques described herein may enable more efficient scheduling of PSSCH transmissions, and more efficient utilization of communication resources.

Figure 7:
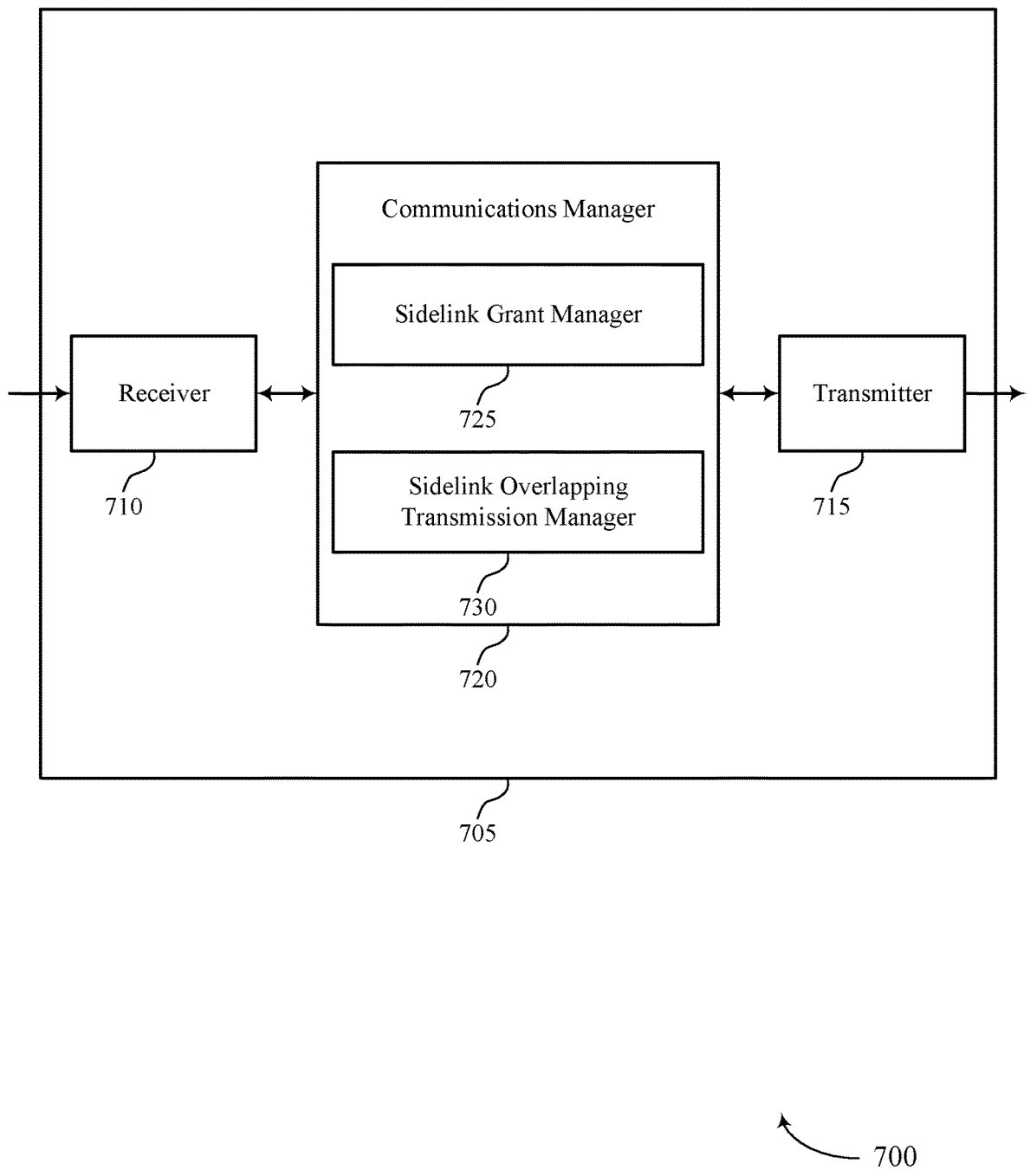

FIG. 7 shows a block diagram 700 of a device 705 that supports overlapping sidelink grant and beam management in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to overlapping sidelink grant and beam management). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to overlapping sidelink grant and beam management). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of overlapping sidelink grant and beam management as described herein. For example, the communications manager 720 may include a sidelink grant manager 725 a sidelink overlapping transmission manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The sidelink grant manager 725 may be configured as or otherwise support a means for receiving, from a base station, first signaling that schedules a first sidelink transmission based on a first grant. The sidelink grant manager 725 may be configured as or otherwise support a means for receiving, from the base station, second signaling that schedules a second sidelink transmission based on a second grant, where the second sidelink transmission at least partially overlaps in time with the first sidelink transmission. The sidelink overlapping transmission manager 730 may be configured as or otherwise support a means for transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

Figure 8:
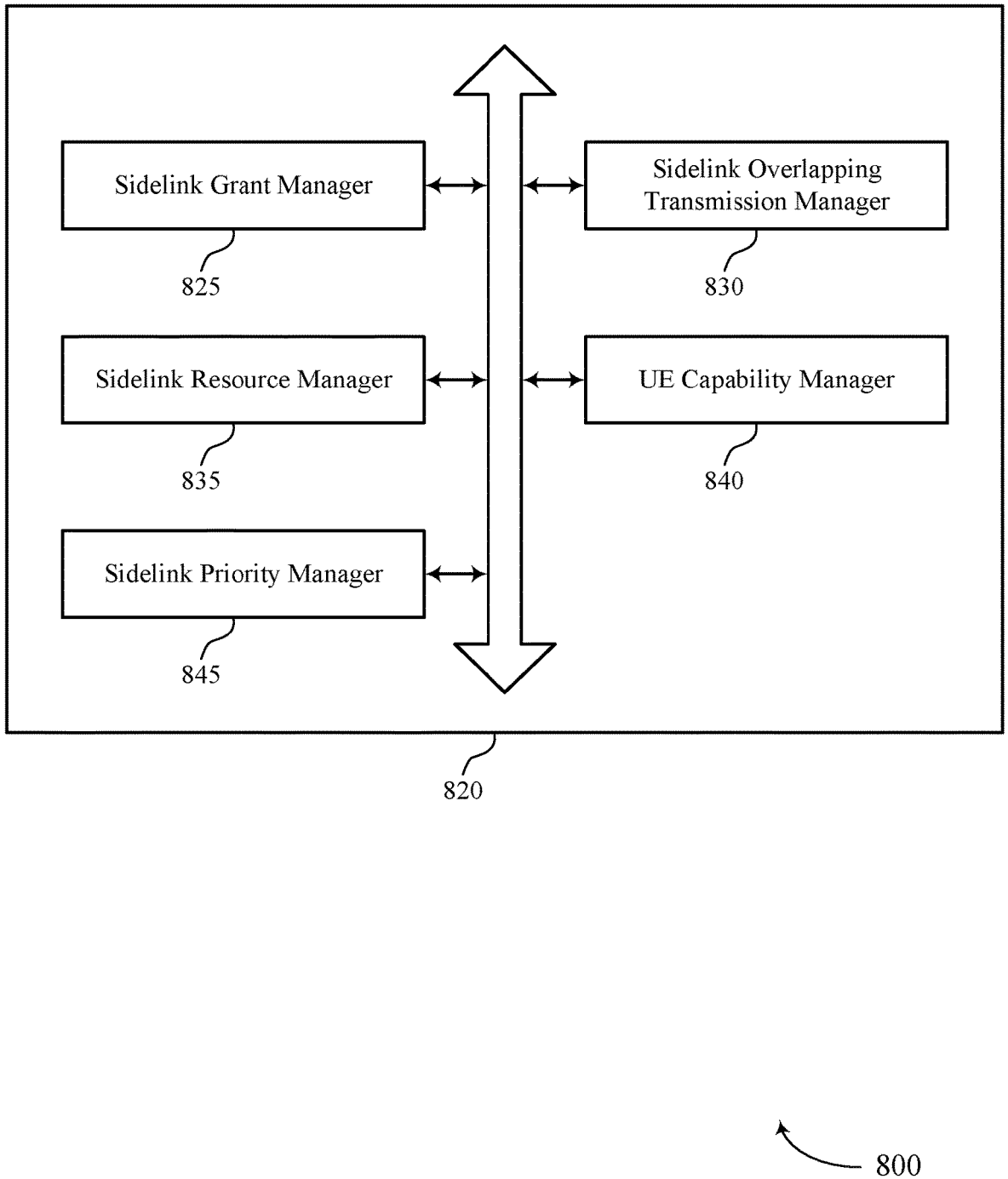
FIG. 8 shows a block diagram of a communications manager that supports overlapping sidelink grant and beam management in accordance with aspects of the present disclosure.

FIG. 8 shows a block diagram 800 of a communications manager 820 that supports overlapping sidelink grant and beam management in accordance with aspects of the present disclosure. The communications manager 820 may be an example of aspects of a communications manager 620, a communications manager 720, or both, as described herein. The communications manager 820, or various components thereof, may be an example of means for performing various aspects of overlapping sidelink grant and beam management as described herein. For example, the communications manager 820 may include a sidelink grant manager 825, a sidelink overlapping transmission manager 830, a sidelink resource manager 835, a UE capability manager 840, a sidelink priority manager 845, or any combination thereof. Each of these components may communicate, directly or indirectly, with one another (e.g., via one or more buses).

The communications manager 820 may support wireless communications at a UE in accordance with examples as disclosed herein. The sidelink grant manager 825 may be configured as or otherwise support a means for receiving, from a base station, first signaling that schedules a first sidelink transmission based on a first grant. In some examples, the sidelink grant manager 825 may be configured as or otherwise support a means for receiving, from the base station, second signaling that schedules a second sidelink transmission based on a second grant, where the second sidelink transmission at least partially overlaps in time with the first sidelink transmission. The sidelink overlapping transmission manager 830 may be configured as or otherwise support a means for transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

In some examples, the sidelink resource manager 835 may be configured as or otherwise support a means for receiving, from the base station, an indication that the first sidelink transmission is associated with a first beam and a first set of frequency resources. In some examples, the sidelink resource manager 835 may be configured as or otherwise support a means for receiving, from the base station, an indication that the second sidelink transmission is associated with the first beam and a second set of frequency resources. In some examples, to transmit at least one of the first sidelink transmission and the second sidelink transmission, the sidelink overlapping transmission manager 830 may be configured as or otherwise support a means for transmitting the first sidelink transmission via the first beam using the first set of frequency resources and the second sidelink transmission via the first beam using the second set of frequency resources based on a frequency separation between the first set of frequency resources and the second set of frequency resources being smaller than or equal to a threshold.

In some examples, the sidelink resource manager 835 may be configured as or otherwise support a means for receiving, from the base station, an indication that the first sidelink transmission is associated with a first beam and a first set of frequency resources. In some examples, the sidelink resource manager 835 may be configured as or otherwise support a means for receiving, from the base station, an indication that the second sidelink transmission is associated with the first beam and a second set of frequency resources. In some examples, to transmit at least one of the first sidelink transmission and the second sidelink transmission, the sidelink overlapping transmission manager 830 may be configured as or otherwise support a means for transmitting the first sidelink transmission via the first beam using the first set of frequency resources and refraining from transmitting the second sidelink transmission based on a frequency separation between the first set of frequency resources and the second set of frequency resources exceeding a threshold.

In some examples, the sidelink priority manager 845 may be configured as or otherwise support a means for receiving, from the base station, an indication that the first sidelink transmission is associated with a first priority level. In some examples, the sidelink priority manager 845 may be configured as or otherwise support a means for receiving, from the base station, an indication that the second sidelink transmission is associated with a second priority level lower than the first priority level, where transmitting the first sidelink transmission and refraining from transmitting the second sidelink transmission is based on the second priority level being lower than the first priority level.

In some examples, the sidelink resource manager 835 may be configured as or otherwise support a means for receiving, from the base station, an indication that the first sidelink transmission is associated with a first beam. In some examples, the sidelink resource manager 835 may be configured as or otherwise support a means for receiving, from the base station, an indication that the second sidelink transmission is associated with a second beam. In some examples, to transmit at least one of the first sidelink transmission and the second sidelink transmission, the sidelink overlapping transmission manager 830 may be configured as or otherwise support a means for transmitting the first sidelink transmission via the first beam and the second sidelink transmission via the second beam.

In some examples, the sidelink resource manager 835 may be configured as or otherwise support a means for receiving, from the base station, an indication that the first sidelink transmission is associated with a first beam. In some examples, the sidelink resource manager 835 may be configured as or otherwise support a means for receiving, from the base station, an indication that the second sidelink transmission is associated with a second beam. In some examples, to transmit at least one of the first sidelink transmission and the second sidelink transmission, the sidelink overlapping transmission manager 830 may be configured as or otherwise support a means for transmitting the first sidelink transmission via the first beam and refraining from transmitting the second sidelink transmission.

In some examples, the sidelink priority manager 845 may be configured as or otherwise support a means for receiving, from the base station, an indication that the first sidelink transmission is associated with a first priority level. In some examples, the sidelink priority manager 845 may be configured as or otherwise support a means for receiving, from the base station, an indication that the second sidelink transmission is associated with a second priority level lower than the first priority level, where transmitting the first sidelink transmission and refraining from transmitting the second sidelink transmission is based on the second priority level being lower than the first priority level.

In some examples, the sidelink resource manager 835 may be configured as or otherwise support a means for receiving, from the base station, an indication that the first sidelink transmission is associated with a first set of frequency resources including a first subset of frequency resources and a second subset of resources. In some examples, the sidelink resource manager 835 may be configured as or otherwise support a means for receiving, from the base station, an indication that the second sidelink transmission is associated with a second set of frequency resources including the second subset of frequency resources and a third subset of frequency resources. In some examples, to transmit at least one of the first sidelink transmission and the second sidelink transmission, the sidelink overlapping transmission manager 830 may be configured as or otherwise support a means for transmitting the first sidelink transmission using the first set of frequency resources and the sidelink overlapping transmission manager 830 may be configured as or otherwise support a means for transmitting the second sidelink transmission using the third subset of frequency resources.

In some examples, the sidelink priority manager 845 may be configured as or otherwise support a means for receiving, from the base station, an indication that the first sidelink transmission is associated with a first priority level. In some examples, the sidelink priority manager 845 may be configured as or otherwise support a means for receiving, from the base station, an indication that the second sidelink transmission is associated with a second priority level lower than the first priority level, where transmitting the first sidelink transmission using the first set of frequency resources and transmitting the second sidelink transmission using the third subset of frequency resources is based on the second priority level being lower than the first priority level.

In some examples, the sidelink resource manager 835 may be configured as or otherwise support a means for receiving, from the base station, an indication that the first sidelink transmission is associated with a first beam. In some examples, the sidelink resource manager 835 may be configured as or otherwise support a means for receiving, from the base station, an indication that the second sidelink transmission is associated with a second beam. In some examples, to transmit at least one of the first sidelink transmission and the second sidelink transmission, the sidelink overlapping transmission manager 830 may be configured as or otherwise support a means for transmitting the first sidelink transmission via the first beam and the sidelink overlapping transmission manager 830 may be configured as or otherwise support a means for transmitting the second sidelink transmission via the second beam.

In some examples, the sidelink resource manager 835 may be configured as or otherwise support a means for receiving, from the base station, an indication that the first sidelink transmission is associated with a first beam. In some examples, the sidelink resource manager 835 may be configured as or otherwise support a means for receiving, from the base station, an indication that the second sidelink transmission is associated with the first beam. In some examples, to transmit at least one of the first sidelink transmission and the second sidelink transmission, the sidelink overlapping transmission manager 830 may be configured as or otherwise support a means for transmitting the first sidelink transmission and the second sidelink transmission using the first beam.

In some examples, the sidelink resource manager 835 may be configured as or otherwise support a means for receiving, from the base station, an indication that the first sidelink transmission is associated with a first set of frequency resources including a first subset of frequency resources and a second subset of resources. In some examples, the sidelink resource manager 835 may be configured as or otherwise support a means for receiving, from the base station, an indication that the second sidelink transmission is associated with a second set of frequency resources including the second subset of frequency resources and a third subset of frequency resources. In some examples, to transmit at least one of the first sidelink transmission and the second sidelink transmission, the sidelink overlapping transmission manager 830 may be configured as or otherwise support a means for transmitting the first sidelink transmission using the first subset of frequency resources and a first portion of the second subset of frequency resources and the sidelink overlapping transmission manager 830 may be configured as or otherwise support a means for transmitting the second sidelink transmission using the third subset of frequency resources and a second portion of the second subset of frequency resources.

In some examples, the sidelink priority manager 845 may be configured as or otherwise support a means for receiving, from the base station, an indication that the first sidelink transmission is associated with a first priority level. In some examples, the sidelink priority manager 845 may be configured as or otherwise support a means for receiving, from the base station, an indication that the second sidelink transmission is associated with a second priority level, where the first portion and the second portion have respective sizes based on a relationship between the first priority level and the second priority level.

In some examples, the first portion and the second portion have respective sizes based on a first block error rate target for the first sidelink transmission, a second block error rate target for the second sidelink transmission, a channel state information condition, a transmission power capability of the UE, or a combination thereof.

In some examples, the first portion and the second portion have respective sizes based on a size relationship between the first set of frequency resources and the second set of frequency resources.

In some examples, the UE capability manager 840 may be configured as or otherwise support a means for transmitting, to the base station, a report indicating a capability of the UE to transmit a quantity of one or more of temporally overlapping sidelink channel transmissions, where transmitting at least one of the first sidelink transmission and the second sidelink transmission is based at least in part on the indicated capability of the UE.

In some examples, the capability includes a first capability of the UE to transmit a first quantity of one or more beams concurrently, a second capability of the UE to transmit a second quantity of one or more concurrent sidelink transmissions per beam, a third capability of the UE to transmit a third quantity of concurrent sidelink transmissions regardless of beam allocation, or any combination thereof.

Figure 9:
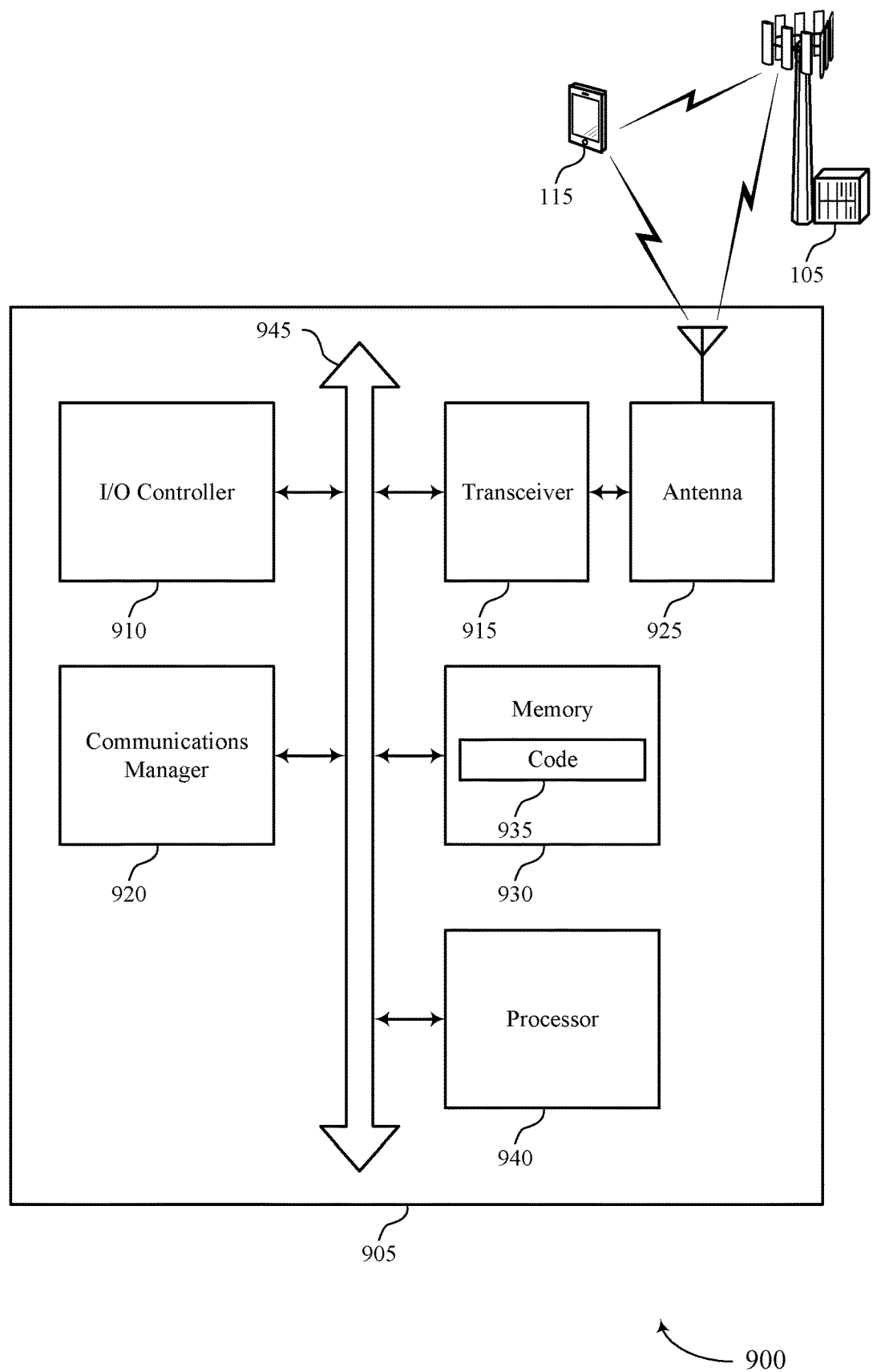
FIG. 9 shows a diagram of a system including a device that supports overlapping sidelink grant and beam management in accordance with aspects of the present disclosure.

FIG. 9 shows a diagram of a system 900 including a device 905 that supports overlapping sidelink grant and beam management in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting overlapping sidelink grant and beam management). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, first signaling that schedules a first sidelink transmission based on a first grant. The communications manager 920 may be configured as or otherwise support a means for receiving, from the base station, second signaling that schedules a second sidelink transmission based on a second grant, where the second sidelink transmission at least partially overlaps in time with the first sidelink transmission. The communications manager 920 may be configured as or otherwise support a means for transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission.

By including or configuring the communications manager 920 in accordance with examples as described herein, the device 905 may support techniques for reducing collisions between overlapping PSSCH transmissions. Accordingly, techniques described herein may enable more efficient scheduling of PSSCH transmissions, improved communication reliability, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of overlapping sidelink grant and beam management as described herein, or the processor 940 and the memory 930 may be otherwise configured to perform or support such operations.

Figure 10:
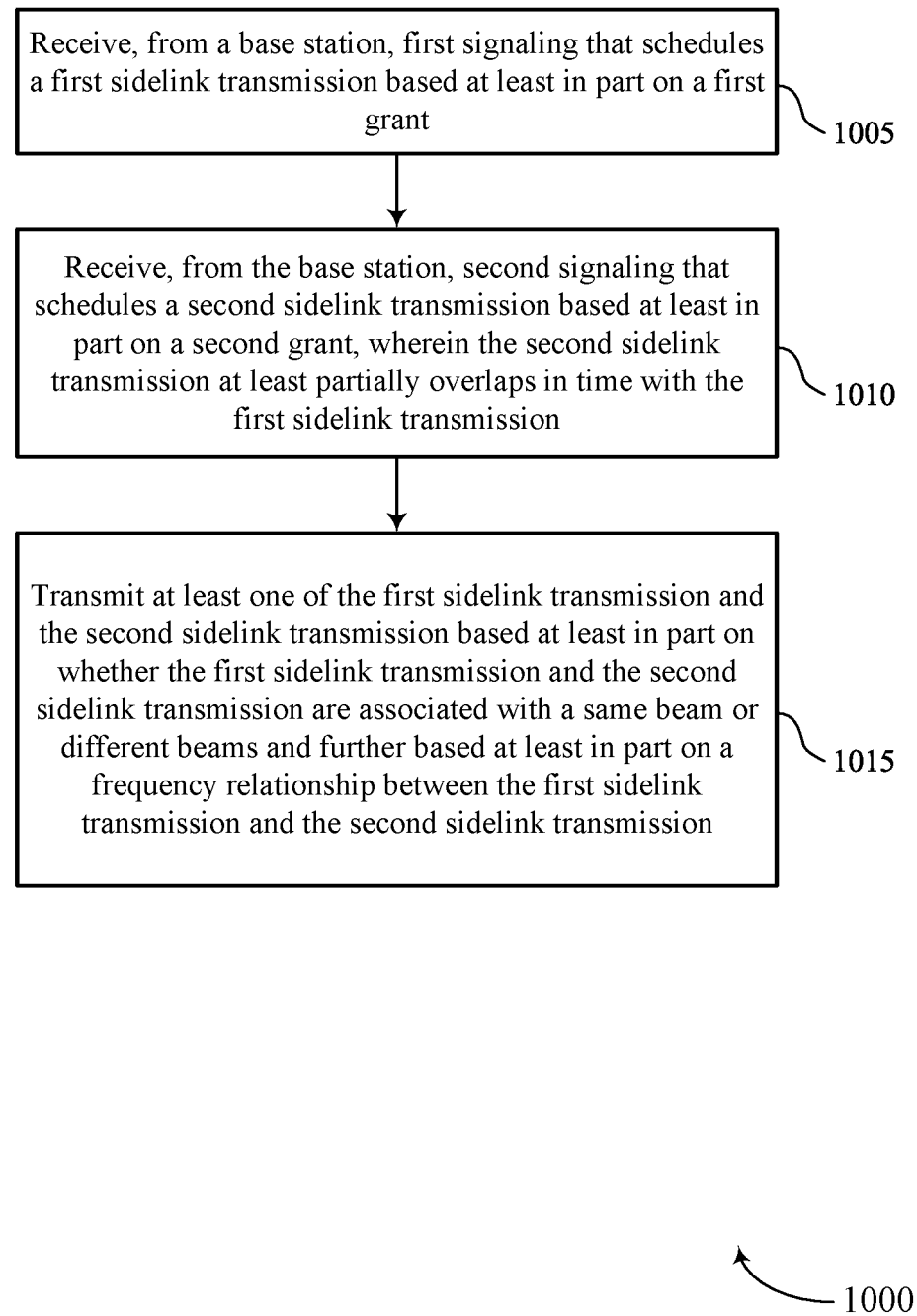
FIGS. 10 through 13 show flowcharts illustrating methods that support overlapping sidelink grant and beam management in accordance with aspects of the present disclosure.

FIG. 10 shows a flowchart illustrating a method 1000 that supports overlapping sidelink grant and beam management in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, first signaling that schedules a first sidelink transmission based on a first grant. The operations of 1005 may be performed in accordance with examples as disclosed herein. In some examples, aspects of the operations of 1005 may be performed by a sidelink grant manager 825 as described with reference to FIG. 8. Additionally or alternatively, means for performing 1005 may, but not necessarily, include, for example, antenna 925, transceiver 915, communications manager 920, memory 930 (including code 935), processor 940, bus 945, or any combination thereof.

At 1010, the method may include receiving, from the base station, second signaling that schedules a second sidelink transmission based on a second grant, where the second sidelink transmission at least partially overlaps in time with the first sidelink transmission. The operations of 1010 may be performed in accordance with examples as disclosed herein. In some examples, aspects of the operations of 1010 may be performed by a sidelink grant manager 825 as described with reference to FIG. 8. Additionally or alternatively, means for performing 1010 may, but not necessarily, include, for example, antenna 925, transceiver 915, communications manager 920, memory 930 (including code 935), processor 940, bus 945, or any combination thereof.

At 1015, the method may include transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission. The operations of 1015 may be performed in accordance with examples as disclosed herein. In some examples, aspects of the operations of 1015 may be performed by a sidelink overlapping transmission manager 830 as described with reference to FIG. 8. Additionally or alternatively, means for performing 1015 may, but not necessarily, include, for example, antenna 925, transceiver 915, communications manager 920, memory 930 (including code 935), processor 940, bus 945, or any combination thereof.

Figure 11:
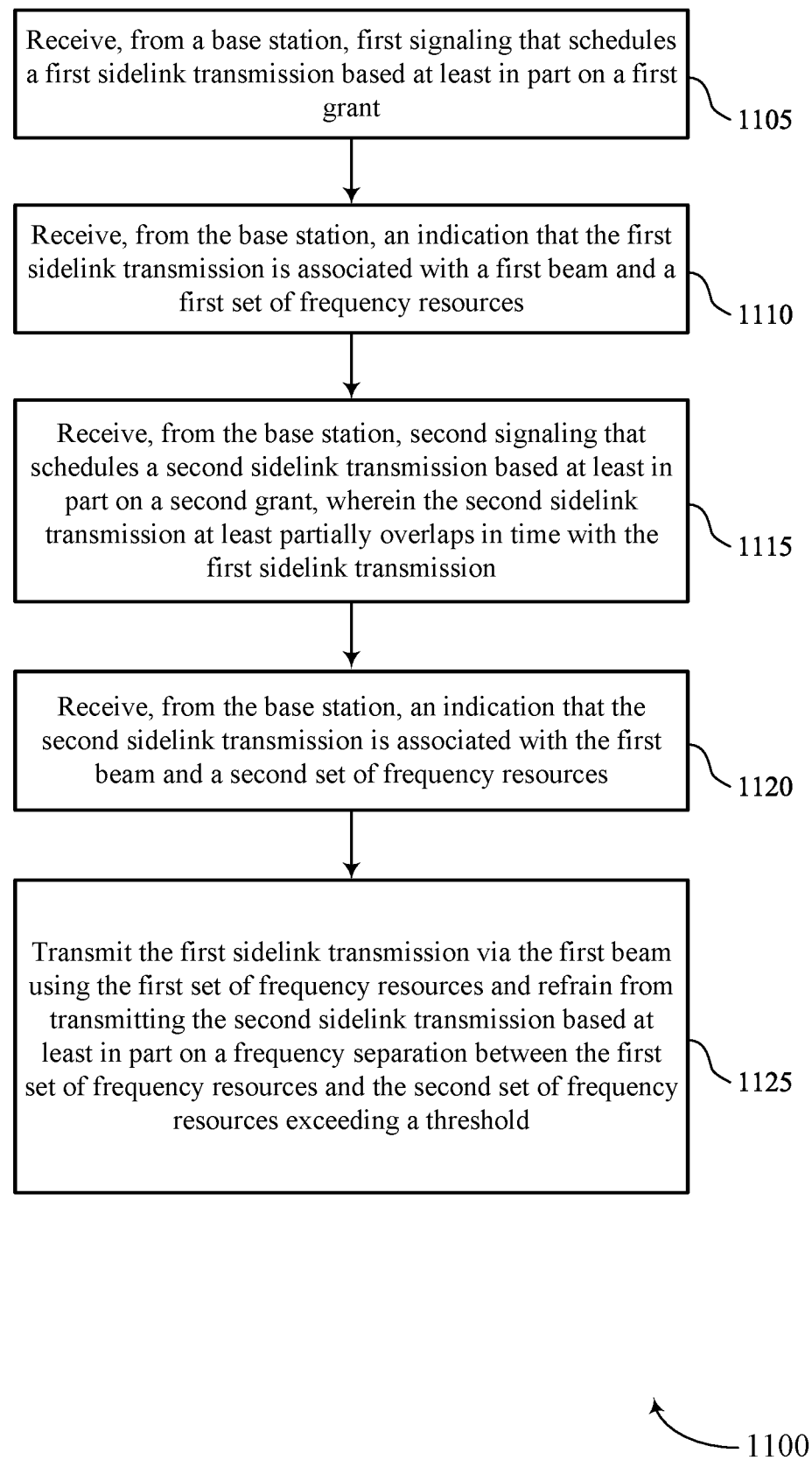

FIG. 11 shows a flowchart illustrating a method 1100 that supports overlapping sidelink grant and beam management in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, first signaling that schedules a first sidelink transmission based on a first grant. The operations of 1105 may be performed in accordance with examples as disclosed herein. In some examples, aspects of the operations of 1105 may be performed by a sidelink grant manager 825 as described with reference to FIG. 8. Additionally or alternatively, means for performing 1105 may, but not necessarily, include, for example, antenna 925, transceiver 915, communications manager 920, memory 930 (including code 935), processor 940, bus 945, or any combination thereof.

At 1110, the method may include receiving, from the base station, an indication that the first sidelink transmission is associated with a first beam and a first set of frequency resources. The operations of 1110 may be performed in accordance with examples as disclosed herein. In some examples, aspects of the operations of 1110 may be performed by a sidelink resource manager 835 as described with reference to FIG. 8. Additionally or alternatively, means for performing 1110 may, but not necessarily, include, for example, antenna 925, transceiver 915, communications manager 920, memory 930 (including code 935), processor 940, bus 945, or any combination thereof.

At 1115, the method may include receiving, from the base station, second signaling that schedules a second sidelink transmission based on a second grant, where the second sidelink transmission at least partially overlaps in time with the first sidelink transmission. The operations of 1115 may be performed in accordance with examples as disclosed herein. In some examples, aspects of the operations of 1115 may be performed by a sidelink grant manager 825 as described with reference to FIG. 8. Additionally or alternatively, means for performing 1115 may, but not necessarily, include, for example, antenna 925, transceiver 915, communications manager 920, memory 930 (including code 935), processor 940, bus 945, or any combination thereof.

At 1120, the method may include receiving, from the base station, an indication that the second sidelink transmission is associated with the first beam and a second set of frequency resources. The operations of 1120 may be performed in accordance with examples as disclosed herein. In some examples, aspects of the operations of 1120 may be performed by a sidelink resource manager 835 as described with reference to FIG. 8. Additionally or alternatively, means for performing 1120 may, but not necessarily, include, for example, antenna 925, transceiver 915, communications manager 920, memory 930 (including code 935), processor 940, bus 945, or any combination thereof.

At 1125, the method may include transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission. In some examples, transmitting at least one of the first sidelink transmission and the second sidelink transmission may include transmitting the first sidelink transmission via the first beam using the first set of frequency resources and refraining from transmitting the second sidelink transmission based on a frequency separation between the first set of frequency resources and the second set of frequency resources exceeding a threshold. The operations of 1125 may be performed in accordance with examples as disclosed herein. In some examples, aspects of the operations of 1125 may be performed by a sidelink overlapping transmission manager 830 as described with reference to FIG. 8. Additionally or alternatively, means for performing 1125 may, but not necessarily, include, for example, antenna 925, transceiver 915, communications manager 920, memory 930 (including code 935), processor 940, bus 945, or any combination thereof.

Figure 12:
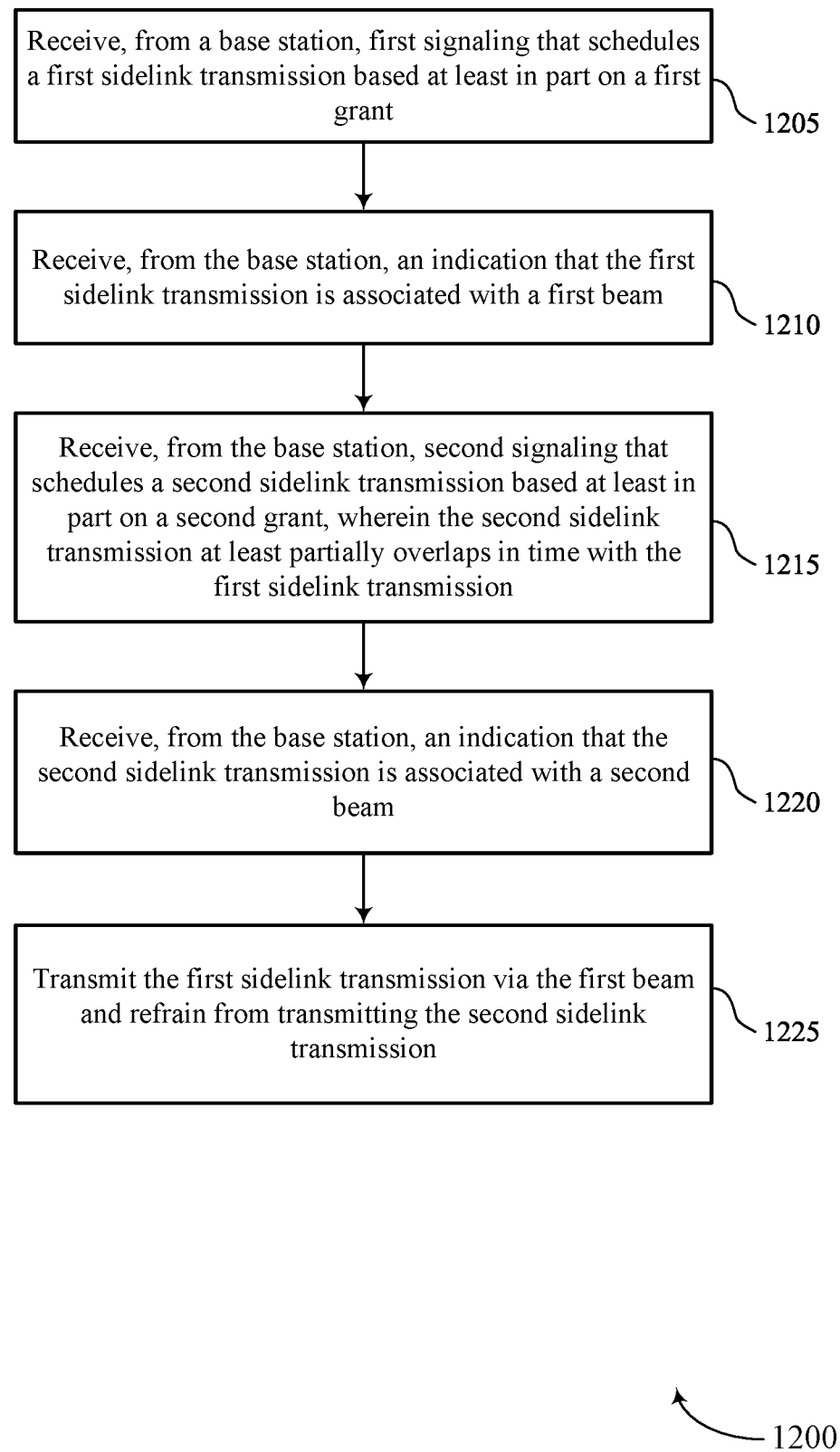

FIG. 12 shows a flowchart illustrating a method 1200 that supports overlapping sidelink grant and beam management in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, first signaling that schedules a first sidelink transmission based on a first grant. The operations of 1205 may be performed in accordance with examples as disclosed herein. In some examples, aspects of the operations of 1205 may be performed by a sidelink grant manager 825 as described with reference to FIG. 8. Additionally or alternatively, means for performing 1205 may, but not necessarily, include, for example, antenna 925, transceiver 915, communications manager 920, memory 930 (including code 935), processor 940, bus 945, or any combination thereof.

At 1210, the method may include receiving, from the base station, an indication that the first sidelink transmission is associated with a first beam. The operations of 1210 may be performed in accordance with examples as disclosed herein. In some examples, aspects of the operations of 1210 may be performed by a sidelink resource manager 835 as described with reference to FIG. 8. Additionally or alternatively, means for performing 1210 may, but not necessarily, include, for example, antenna 925, transceiver 915, communications manager 920, memory 930 (including code 935), processor 940, bus 945, or any combination thereof.

At 1215, the method may include receiving, from the base station, second signaling that schedules a second sidelink transmission based on a second grant, where the second sidelink transmission at least partially overlaps in time with the first sidelink transmission. The operations of 1215 may be performed in accordance with examples as disclosed herein. In some examples, aspects of the operations of 1215 may be performed by a sidelink grant manager 825 as described with reference to FIG. 8. Additionally or alternatively, means for performing 1215 may, but not necessarily, include, for example, antenna 925, transceiver 915, communications manager 920, memory 930 (including code 935), processor 940, bus 945, or any combination thereof.

At 1220, the method may include receiving, from the base station, an indication that the second sidelink transmission is associated with a second beam. The operations of 1220 may be performed in accordance with examples as disclosed herein. In some examples, aspects of the operations of 1220 may be performed by a sidelink resource manager 835 as described with reference to FIG. 8. Additionally or alternatively, means for performing 1220 may, but not necessarily, include, for example, antenna 925, transceiver 915, communications manager 920, memory 930 (including code 935), processor 940, bus 945, or any combination thereof.

At 1225, the method may include transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission. In some examples, transmitting at least one of the first sidelink transmission and the second sidelink transmission may include transmitting the first sidelink transmission via the first beam and refraining from transmitting the second sidelink transmission. The operations of 1225 may be performed in accordance with examples as disclosed herein. In some examples, aspects of the operations of 1225 may be performed by a sidelink overlapping transmission manager 830 as described with reference to FIG. 8. Additionally or alternatively, means for performing 1225 may, but not necessarily, include, for example, antenna 925, transceiver 915, communications manager 920, memory 930 (including code 935), processor 940, bus 945, or any combination thereof.

Figure 13:
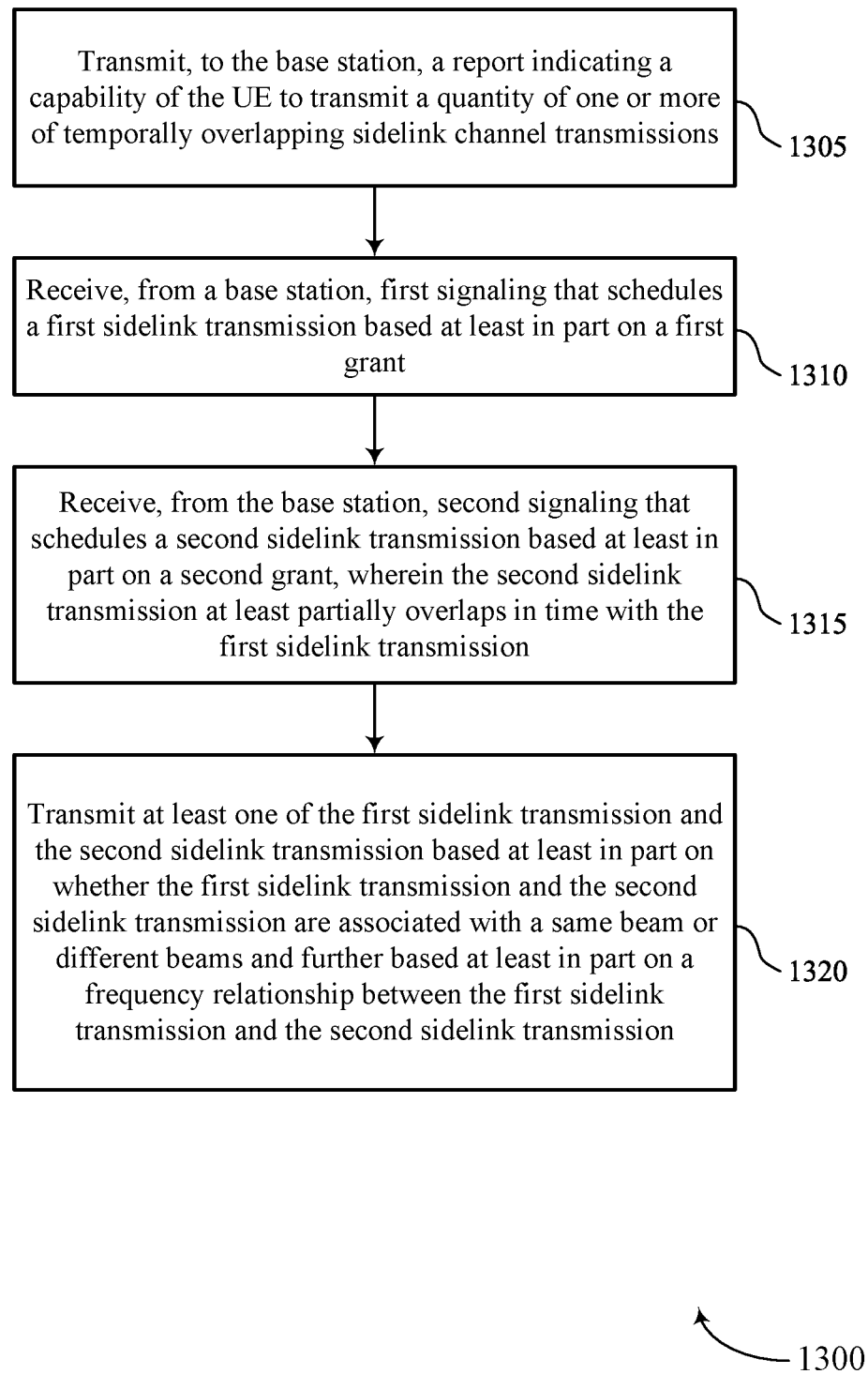

FIG. 13 shows a flowchart illustrating a method 1300 that supports overlapping sidelink grant and beam management in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include transmitting, to the base station, a report indicating a capability of the UE to transmit a quantity of one or more of temporally overlapping sidelink channel transmissions. The operations of 1305 may be performed in accordance with examples as disclosed herein. In some examples, aspects of the operations of 1305 may be performed by a UE capability manager 840 as described with reference to FIG. 8. Additionally or alternatively, means for performing 1305 may, but not necessarily, include, for example, antenna 925, transceiver 915, communications manager 920, memory 930 (including code 935), processor 940, bus 945, or any combination thereof.

At 1310, the method may include receiving, from a base station, first signaling that schedules a first sidelink transmission based on a first grant. The operations of 1310 may be performed in accordance with examples as disclosed herein. In some examples, aspects of the operations of 1310 may be performed by a sidelink grant manager 825 as described with reference to FIG. 8. Additionally or alternatively, means for performing 1310 may, but not necessarily, include, for example, antenna 925, transceiver 915, communications manager 920, memory 930 (including code 935), processor 940, bus 945, or any combination thereof.

At 1315, the method may include receiving, from the base station, second signaling that schedules a second sidelink transmission based on a second grant, where the second sidelink transmission at least partially overlaps in time with the first sidelink transmission. The operations of 1315 may be performed in accordance with examples as disclosed herein. In some examples, aspects of the operations of 1315 may be performed by a sidelink grant manager 825 as described with reference to FIG. 8. Additionally or alternatively, means for performing 1315 may, but not necessarily, include, for example, antenna 925, transceiver 915, communications manager 920, memory 930 (including code 935), processor 940, bus 945, or any combination thereof.

At 1320, the method may include transmitting at least one of the first sidelink transmission and the second sidelink transmission based on whether the first sidelink transmission and the second sidelink transmission are associated with a same beam or different beams and further based on a frequency relationship between the first sidelink transmission and the second sidelink transmission. In some cases, transmitting at least one of the first sidelink transmission and the second sidelink transmission may be further based at least in part on the capability of the UE (e.g., as indicated at 1305). The operations of 1320 may be performed in accordance with examples as disclosed herein. In some examples, aspects of the operations of 1320 may be performed by a sidelink overlapping transmission manager 830 as described with reference to FIG. 8. Additionally or alternatively, means for performing 1320 may, but not necessarily, include, for example, antenna 925, transceiver 915, communications manager 920, memory 930 (including code 935), processor 940, bus 945, or any combination thereof.

The following provides an overview of aspects of the present disclosure:

Aspect 1: A method for wireless communications at a UE, comprising: receiving, from a base station, first signaling that schedules a first sidelink transmission based at least in part on a first grant; receiving, from the base station, second signaling that schedules a second sidelink transmission based at least in part on a second grant, wherein the second sidelink transmission at least partially overlaps in time with the first sidelink transmission; and transmitting at least one of the first sidelink transmission and the second sidelink transmission based at least in part on whether the first sidelink transmission and the second sidelink transmission are associated with a same beam or different beams and further based at least in part on a frequency relationship between the first sidelink transmission and the second sidelink transmission.

Aspect 2: The method of aspect 1, further comprising: receiving, from the base station, an indication that the first sidelink transmission is associated with a first beam and a first set of frequency resources; and receiving, from the base station, an indication that the second sidelink transmission is associated with the first beam and a second set of frequency resources, wherein transmitting at least one of the first sidelink transmission and the second sidelink transmission comprises: transmitting the first sidelink transmission via the first beam using the first set of frequency resources and the second sidelink transmission via the first beam using the second set of frequency resources based at least in part on a frequency separation between the first set of frequency resources and the second set of frequency resources being smaller than or equal to a threshold.

Aspect 3: The method of any of aspects 1 through 2, further comprising: receiving, from the base station, an indication that the first sidelink transmission is associated with a first beam and a first set of frequency resources; and receiving, from the base station, an indication that the second sidelink transmission is associated with the first beam and a second set of frequency resources, wherein transmitting at least one of the first sidelink transmission and the second sidelink transmission comprises: transmitting the first sidelink transmission via the first beam using the first set of frequency resources and refraining from transmitting the second sidelink transmission based at least in part on a frequency separation between the first set of frequency resources and the second set of frequency resources exceeding a threshold.

Aspect 4: The method of aspect 3, further comprising: receiving, from the base station, an indication that the first sidelink transmission is associated with a first priority level; and receiving, from the base station, an indication that the second sidelink transmission is associated with a second priority level lower than the first priority level, wherein transmitting the first sidelink transmission and refraining from transmitting the second sidelink transmission is based at least in part on the second priority level being lower than the first priority level.

Aspect 5: The method of any of aspects 1 through 4, further comprising: receiving, from the base station, an indication that the first sidelink transmission is associated with a first beam; and receiving, from the base station, an indication that the second sidelink transmission is associated with a second beam, wherein transmitting at least one of the first sidelink transmission and the second sidelink transmission comprises: transmitting the first sidelink transmission via the first beam and the second sidelink transmission via the second beam.

Aspect 6: The method of any of aspects 1 through 5, further comprising: receiving, from the base station, an indication that the first sidelink transmission is associated with a first beam; and receiving, from the base station, an indication that the second sidelink transmission is associated with a second beam, wherein transmitting at least one of the first sidelink transmission and the second sidelink transmission comprises: transmitting the first sidelink transmission via the first beam and refraining from transmitting the second sidelink transmission.

Aspect 7: The method of aspect 6, further comprising: receiving, from the base station, an indication that the first sidelink transmission is associated with a first priority level; and receiving, from the base station, an indication that the second sidelink transmission is associated with a second priority level lower than the first priority level, wherein transmitting the first sidelink transmission and refraining from transmitting the second sidelink transmission is based at least in part on the second priority level being lower than the first priority level.

Aspect 8: The method of any of aspects 1 through 7, further comprising: receiving, from the base station, an indication that the first sidelink transmission is associated with a first set of frequency resources comprising a first subset of frequency resources and a second subset of resources; and receiving, from the base station, an indication that the second sidelink transmission is associated with a second set of frequency resources comprising the second subset of frequency resources and a third subset of frequency resources, wherein transmitting at least one of the first sidelink transmission and the second sidelink transmission comprises: transmitting the first sidelink transmission using the first set of frequency resources; and transmitting the second sidelink transmission using the third subset of frequency resources.

Aspect 9: The method of aspect 8, further comprising: receiving, from the base station, an indication that the first sidelink transmission is associated with a first priority level; and receiving, from the base station, an indication that the second sidelink transmission is associated with a second priority level lower than the first priority level, wherein transmitting the first sidelink transmission using the first set of frequency resources and transmitting the second sidelink transmission using the third subset of frequency resources is based at least in part on the second priority level being lower than the first priority level.

Aspect 10: The method of any of aspects 8 through 9, further comprising: receiving, from the base station, an indication that the first sidelink transmission is associated with a first beam; and receiving, from the base station, an indication that the second sidelink transmission is associated with a second beam, wherein transmitting at least one of the first sidelink transmission and the second sidelink transmission comprises: transmitting the first sidelink transmission via the first beam; and transmitting the second sidelink transmission via the second beam.

Aspect 11: The method of any of aspects 8 through 10, further comprising: receiving, from the base station, an indication that the first sidelink transmission is associated with a first beam; and receiving, from the base station, an indication that the second sidelink transmission is associated with the first beam, wherein transmitting at least one of the first sidelink transmission and the second sidelink transmission comprises: transmitting the first sidelink transmission and the second sidelink transmission using the first beam.

Aspect 12: The method of any of aspects 1 through 11, further comprising: receiving, from the base station, an indication that the first sidelink transmission is associated with a first set of frequency resources comprising a first subset of frequency resources and a second subset of resources; and receiving, from the base station, an indication that the second sidelink transmission is associated with a second set of frequency resources comprising the second subset of frequency resources and a third subset of frequency resources, wherein transmitting at least one of the first sidelink transmission and the second sidelink transmission comprises: transmitting the first sidelink transmission using the first subset of frequency resources and a first portion of the second subset of frequency resources; and transmitting the second sidelink transmission using the third subset of frequency resources and a second portion of the second subset of frequency resources.

Aspect 13: The method of aspect 12, further comprising: receiving, from the base station, an indication that the first sidelink transmission is associated with a first priority level; and receiving, from the base station, an indication that the second sidelink transmission is associated with a second priority level, wherein the first portion and the second portion have respective sizes based at least in part on a relationship between the first priority level and the second priority level.

Aspect 14: The method of any of aspects 12 through 13, wherein the first portion and the second portion have respective sizes based at least in part on a first block error rate target for the first sidelink transmission, a second block error rate target for the second sidelink transmission, a channel state information condition, a transmission power capability of the UE, or a combination thereof.

Aspect 15: The method of any of aspects 12 through 14, wherein the first portion and the second portion have respective sizes based at least in part on a size relationship between the first set of frequency resources and the second set of frequency resources.

Aspect 16: The method of any of aspects 1 through 15, further comprising: transmitting, to the base station, a report indicating a capability of the UE to transmit a quantity of one or more of temporally overlapping sidelink channel transmissions, wherein transmitting at least one of the first sidelink transmission and the second sidelink transmission is based at least in part on the indicated capability of the UE.

Aspect 17: The method of aspect 16, wherein the capability comprises a first capability of the UE to transmit a first quantity of one or more beams concurrently, a second capability of the UE to transmit a second quantity of one or more concurrent sidelink transmissions per beam, a third capability of the UE to transmit a third quantity of concurrent sidelink transmissions regardless of beam allocation, or any combination thereof.

Aspect 18: An apparatus comprising memory, transceiver, and at least one processor of a UE coupled with the memory and the transceiver, the at least one processor configured to cause the apparatus to perform a method of any of aspects 1 through 17.

Aspect 19: An apparatus for wireless communications at a UE, comprising at least one means for performing a method of any of aspects 1 through 17.

Aspect 20: A non-transitory computer-readable medium storing code for wireless communications at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving, from a base station, first signaling that schedules a first sidelink transmission based at least in part on a first grant;
    receiving, from the base station, second signaling that schedules a second sidelink transmission based at least in part on a second grant, wherein the second sidelink transmission at least partially overlaps in time with the first sidelink transmission;
    receiving, from the base station, an indication that the first sidelink transmission is associated with a first beam and a first set of frequency resources;
    receiving, from the base station, an indication that the second sidelink transmission is associated with the first beam and a second set of frequency resources; and
    transmitting at least one of the first sidelink transmission and the second sidelink transmission based at least in part on the first beam being a same beam and further based at least in part on a frequency relationship between the first sidelink transmission and the second sidelink transmission.

2. The method of claim 1,
wherein transmitting at least one of the first sidelink transmission and the second sidelink transmission comprises:
    transmitting the first sidelink transmission via the first beam using the first set of frequency resources and the second sidelink transmission via the first beam using the second set of frequency resources based at least in part on a frequency separation between the first set of frequency resources and the second set of frequency resources being smaller than or equal to a threshold.

3. The method of claim 1,
wherein transmitting at least one of the first sidelink transmission and the second sidelink transmission comprises:
    transmitting the first sidelink transmission via the first beam using the first set of frequency resources and refraining from transmitting the second sidelink transmission based at least in part on a frequency separation between the first set of frequency resources and the second set of frequency resources exceeding a threshold.

4. The method of claim 3, further comprising:
    receiving, from the base station, an indication that the first sidelink transmission is associated with a first priority level; and
    receiving, from the base station, an indication that the second sidelink transmission is associated with a second priority level lower than the first priority level, wherein transmitting the first sidelink transmission and refraining from transmitting the second sidelink transmission is based at least in part on the second priority level being lower than the first priority level.

5. A method for wireless communications at a user equipment (UE), comprising:
receiving, from a base station, first signaling that schedules a first sidelink transmission based at least in part on a first grant;
receiving, from the base station, second signaling that schedules a second sidelink transmission based at least in part on a second grant, wherein the second sidelink transmission at least partially overlaps in time with the first sidelink transmission;
receiving, from the base station, an indication that the first sidelink transmission is associated with a first beam;
receiving, from the base station, an indication that the second sidelink transmission is associated with a second beam; and
transmitting the first sidelink transmission via the first beam and refraining from transmitting the second sidelink transmission.

6. The method of claim 5, further comprising:
receiving, from the base station, an indication that the first sidelink transmission is associated with a first priority level; and
receiving, from the base station, an indication that the second sidelink transmission is associated with a second priority level lower than the first priority level, wherein transmitting the first sidelink transmission and refraining from transmitting the second sidelink transmission is based at least in part on the second priority level being lower than the first priority level.

7. A method for wireless communications at a user equipment (UE), comprising:
receiving, from a base station, first signaling that schedules a first sidelink transmission based at least in part on a first grant;
receiving, from the base station, second signaling that schedules a second sidelink transmission based at least in part on a second grant, wherein the second sidelink transmission at least partially overlaps in time with the first sidelink transmission;
receiving, from the base station, an indication that the first sidelink transmission is associated with a first set of frequency resources comprising a first subset of frequency resources and a second subset of frequency resources;
receiving, from the base station, an indication that the second sidelink transmission is associated with a second set of frequency resources comprising the second subset of frequency resources and a third subset of frequency resources;
transmitting the first sidelink transmission using the first set of frequency resources; and
transmitting the second sidelink transmission using the third subset of frequency resources.

8. The method of claim 7, further comprising:
receiving, from the base station, an indication that the first sidelink transmission is associated with a first priority level; and
receiving, from the base station, an indication that the second sidelink transmission is associated with a second priority level lower than the first priority level, wherein transmitting the first sidelink transmission using the first set of frequency resources and transmitting the second sidelink transmission using the third subset of frequency resources is based at least in part on the second priority level being lower than the first priority level.

9. The method of claim 7, further comprising:
receiving, from the base station, an indication that the first sidelink transmission is associated with a first beam; and
receiving, from the base station, an indication that the second sidelink transmission is associated with a second beam, wherein transmitting at least one of the first sidelink transmission and the second sidelink transmission comprises:
transmitting the first sidelink transmission via the first beam; and
transmitting the second sidelink transmission via the second beam.

10. The method of claim 7, further comprising:
receiving, from the base station, an indication that the first sidelink transmission is associated with a first beam; and
receiving, from the base station, an indication that the second sidelink transmission is associated with the first beam, wherein transmitting at least one of the first sidelink transmission and the second sidelink transmission comprises:
transmitting the first sidelink transmission and the second sidelink transmission using the first beam.

11. A method for wireless communications at a user equipment (UE), comprising:
receiving, from a base station, first signaling that schedules a first sidelink transmission based at least in part on a first grant;
receiving, from the base station, second signaling that schedules a second sidelink transmission based at least in part on a second grant, wherein the second sidelink transmission at least partially overlaps in time with the first sidelink transmission;
receiving, from the base station, an indication that the first sidelink transmission is associated with a first set of frequency resources comprising a first subset of frequency resources and a second subset of frequency resources;
receiving, from the base station, an indication that the second sidelink transmission is associated with a second set of frequency resources comprising the second subset of frequency resources and a third subset of frequency resources;
transmitting the first sidelink transmission using the first subset of frequency resources and a first portion of the second subset of frequency resources; and
transmitting the second sidelink transmission using the third subset of frequency resources and a second portion of the second subset of frequency resources.

12. The method of claim 11, further comprising:
receiving, from the base station, an indication that the first sidelink transmission is associated with a first priority level; and
receiving, from the base station, an indication that the second sidelink transmission is associated with a second priority level, wherein the first portion and the second portion have respective sizes based at least in part on a relationship between the first priority level and the second priority level.

13. The method of claim 11, wherein the first portion and the second portion have respective sizes based at least in part on a first block error rate target for the first sidelink transmission, a second block error rate target for the second sidelink transmission, a channel state information condition, a transmission power capability of the UE, or a combination thereof.

14. The method of claim 11, wherein the first portion and the second portion have respective sizes based at least in part on a size relationship between the first set of frequency resources and the second set of frequency resources.

15. The method of claim 9, further comprising:

transmitting, to the base station, a report indicating a capability of the UE to transmit a quantity of one or more of temporally overlapping sidelink channel transmissions, wherein transmitting at least one of the first sidelink transmission and the second sidelink transmission is based at least in part on the indicated capability of the UE.

16. The method of claim 15, wherein the capability comprises a first capability of the UE to transmit a first quantity of one or more beams concurrently, a second capability of the UE to transmit a second quantity of one or more concurrent sidelink transmissions per beam, a third capability of the UE to transmit a third quantity of concurrent sidelink transmissions regardless of beam allocation, or any combination thereof.

17. An apparatus for wireless communications, comprising:

memory;

a transceiver; and at least one processor of a user equipment (UE), the at least one processor coupled with the memory and the transceiver, and the at least one processor configured to cause the apparatus to:

receive, from a base station via the transceiver, first signaling that schedules a first sidelink transmission based at least in part on a first grant;

receive, from the base station via the transceiver, second signaling that schedules a second sidelink transmission based at least in part on a second grant, wherein the second sidelink transmission at least partially overlaps in time with the first sidelink transmission;

receive, from the base station via the transceiver, an indication that the first sidelink transmission is associated with a first beam and a first set of frequency resources;

receive, from the base station via the transceiver, an indication that the second sidelink transmission is associated with the first beam and a second set of frequency resources; and transmit, via the transceiver, at least one of the first sidelink transmission and the second sidelink transmission based at least in part on the first beam being a same beam and further based at least in part on a frequency relationship between the first sidelink transmission and the second sidelink transmission.

18. The apparatus of claim 17, wherein, to transmit at least one of the first sidelink transmission and the second sidelink transmission, the at least one processor is configured to cause the apparatus to:

transmit, via the transceiver, the first sidelink transmission via the first beam using the first set of frequency resources and the second sidelink transmission via the first beam using the second set of frequency resources based at least in part on a frequency separation between the first set of frequency resources and the second set of frequency resources being smaller than or equal to a threshold.

19. The apparatus of claim 17, wherein, to transmit at least one of the first sidelink transmission and the second sidelink transmission, the at least one processor is configured to cause the apparatus to:

transmit, via the transceiver, the first sidelink transmission via the first beam using the first set of frequency resources and refrain from transmitting the second sidelink transmission based at least in part on a frequency separation between the first set of frequency resources and the second set of frequency resources exceeding a threshold.

20. An apparatus for wireless communications, comprising:

memory;

a transceiver; and at least one processor of a user equipment (UE), the at least one processor coupled with the memory and the transceiver, and the at least one processor configured to cause the apparatus to:

receive, from a base station via the transceiver, first signaling that schedules a first sidelink transmission based at least in part on a first grant;

receive, from the base station via the transceiver, second signaling that schedules a second sidelink transmission based at least in part on a second grant, wherein the second sidelink transmission at least partially overlaps in time with the first sidelink transmission;

receive, from the base station via the transceiver, an indication that the first sidelink transmission is associated with a first beam;

receive, from the base station via the transceiver, an indication that the second sidelink transmission is associated with a second beam; and transmit, via the transceiver, the first sidelink transmission via the first beam and refrain from transmitting the second sidelink transmission.

21. An apparatus for wireless communications, comprising:

memory:

a transceiver; and at least one processor of a user equipment (UE), the at least one processor coupled with the memory and the transceiver, and the at least one processor configured to cause the apparatus to:

receive, from a base station via the transceiver, first signaling that schedules a first sidelink transmission based at least in part on a first grant;

receive, from the base station via the transceiver, second signaling that schedules a second sidelink transmission based at least in part on a second grant, wherein the second sidelink transmission at least partially overlaps in time with the first sidelink transmission;

receive, from the base station via the transceiver, an indication that the first sidelink transmission is associated with a first set of frequency resources comprising a first subset of frequency resources and a second subset of frequency resources;

receive, from the base station via the transceiver, an indication that the second sidelink transmission is associated with a second set of frequency resources comprising the second subset of frequency resources and a third subset of frequency resources;

transmit, via the transceiver, the first sidelink transmission using the first set of frequency resources; and transmit, via the transceiver, the second sidelink transmission using the third subset of frequency resources.

22. The apparatus of claim 21, the at least one processor further configured to cause the apparatus to:
receive, from the base station via the transceiver, an indication that the first sidelink transmission is associated with a first beam; and
receive, from the base station via the transceiver, an indication that the second sidelink transmission is associated with a second beam, wherein, to transmit at least one of the first sidelink transmission and the second sidelink transmission, the at least one processor is configured to cause the apparatus to:
transmit, via the transceiver, the first sidelink transmission via the first beam; and
transmit, via the transceiver, the second sidelink transmission via the second beam.

23. The apparatus of claim 21, the at least one processor further configured to cause the apparatus to:
receive, from the base station via the transceiver, an indication that the first sidelink transmission is associated with a first beam; and
receive, from the base station via the transceiver, an indication that the second sidelink transmission is associated with the first beam, wherein, to transmit at least one of the first sidelink transmission and the second sidelink transmission, the at least one processor is configured to cause the apparatus to:
transmit, via the transceiver, the first sidelink transmission and the second sidelink transmission using the first beam.

24. An apparatus for wireless communications, comprising:
memory;
a transceiver; and
at least one processor of a user equipment (UE), the at least one processor coupled with the memory and the transceiver, and the at least one processor configured to cause the apparatus to:
receive, from a base station via the transceiver, first signaling that schedules a first sidelink transmission based at least in part on a first grant;
receive, from the base station via the transceiver, second signaling that schedules a second sidelink transmission based at least in part on a second grant, wherein the second sidelink transmission at least partially overlaps in time with the first sidelink transmission;
receive, from the base station via the transceiver, an indication that the first sidelink transmission is associated with a first set of frequency resources comprising a first subset of frequency resources and a second subset of frequency resources;
receive, from the base station via the transceiver, an indication that the second sidelink transmission is associated with a second set of frequency resources comprising the second subset of frequency resources and a third subset of frequency resources;
transmit the first sidelink transmission using the first subset of frequency resources and a first portion of the second subset of frequency resources; and
transmit the second sidelink transmission using the third subset of frequency resources and a second portion of the second subset of frequency resources.

25. The apparatus of claim 22, the at least one processor further configured to cause the apparatus to:
transmit, to the base station via the transceiver, a report indicating a capability of the UE to transmit a quantity of one or more of temporally overlapping sidelink channel transmissions, wherein the at least one processor is configured to cause the apparatus to transmit at least one of the first sidelink transmission and the second sidelink transmission is based at least in part on the indicated capability of the UE.

26. The apparatus of claim 25, wherein the capability comprises a first capability of the UE to transmit a first quantity of one or more beams concurrently, a second capability of the UE to transmit a second quantity of one or more concurrent sidelink transmissions per beam, a third capability of the UE to transmit a third quantity of concurrent sidelink transmissions regardless of beam allocation, or any combination thereof.

* * * * *